(12) United States Patent
Yano

(10) Patent No.: US 11,397,547 B2
(45) Date of Patent: Jul. 26, 2022

(54) JOB PROCESSING SYSTEM, CONTROL METHOD FOR JOB PROCESSING SYSTEM, AND STORAGE MEDIUM FOR NOTIFYING OF A QUALITY OF A RESULTANT PRODUCT

(71) Applicant: CANON KABUSHIKI KAISHA, Tokyo (JP)

(72) Inventor: Takaaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/182,673

(22) Filed: Feb. 23, 2021

(65) Prior Publication Data

US 2021/0279012 A1  Sep. 9, 2021

(30) Foreign Application Priority Data

Mar. 5, 2020  (JP) .............................. JP2020-038138

(51) Int. Cl.
*G06F 3/12* (2006.01)

(52) U.S. Cl.
CPC .......... *G06F 3/1208* (2013.01); *G06F 3/1256* (2013.01); *G06F 3/1275* (2013.01); *G06F 3/1282* (2013.01)

(58) Field of Classification Search
None
See application file for complete search history.

(56) References Cited

U.S. PATENT DOCUMENTS

| | | | |
|---|---|---|---|
| 10,042,592 B1* | 8/2018 | Soriano | G06F 3/1287 |
| 11,079,979 B2* | 8/2021 | Hayashi | H04N 1/00413 |
| 2005/0206925 A1* | 9/2005 | Agehama | G06K 15/02 358/1.9 |
| 2008/0278744 A1* | 11/2008 | Marchesotti | H04N 1/603 358/1.15 |
| 2009/0323085 A1* | 12/2009 | Dattilo | G06K 15/002 358/1.1 |
| 2016/0188268 A1* | 6/2016 | Yamagishi | G06F 3/1273 358/1.15 |
| 2016/0203392 A1* | 7/2016 | Metcalfe | G06F 3/1256 358/1.9 |
| 2020/0358911 A1* | 11/2020 | Kikuchi | G06F 3/1253 |

FOREIGN PATENT DOCUMENTS

JP  2008-009863 A  1/2008

* cited by examiner

*Primary Examiner* — Henok Shiferaw
(74) *Attorney, Agent, or Firm* — Canon U.S.A., Inc. IP Division

(57) ABSTRACT

A job processing system provides a method capable of determining, for each job, an item a notification of which is to be issued as a quality of a resultant product which is obtained by executing a job from among a plurality of items concerning quality. The job processing system receives quality request data, identifies, based on the received quality request data, an item a notification of which is to be issued as a quality of a resultant product which is obtained by executing the job from among a plurality of items concerning quality, and issues a notification of a quality of the resultant product with respect to the identified item.

18 Claims, 18 Drawing Sheets

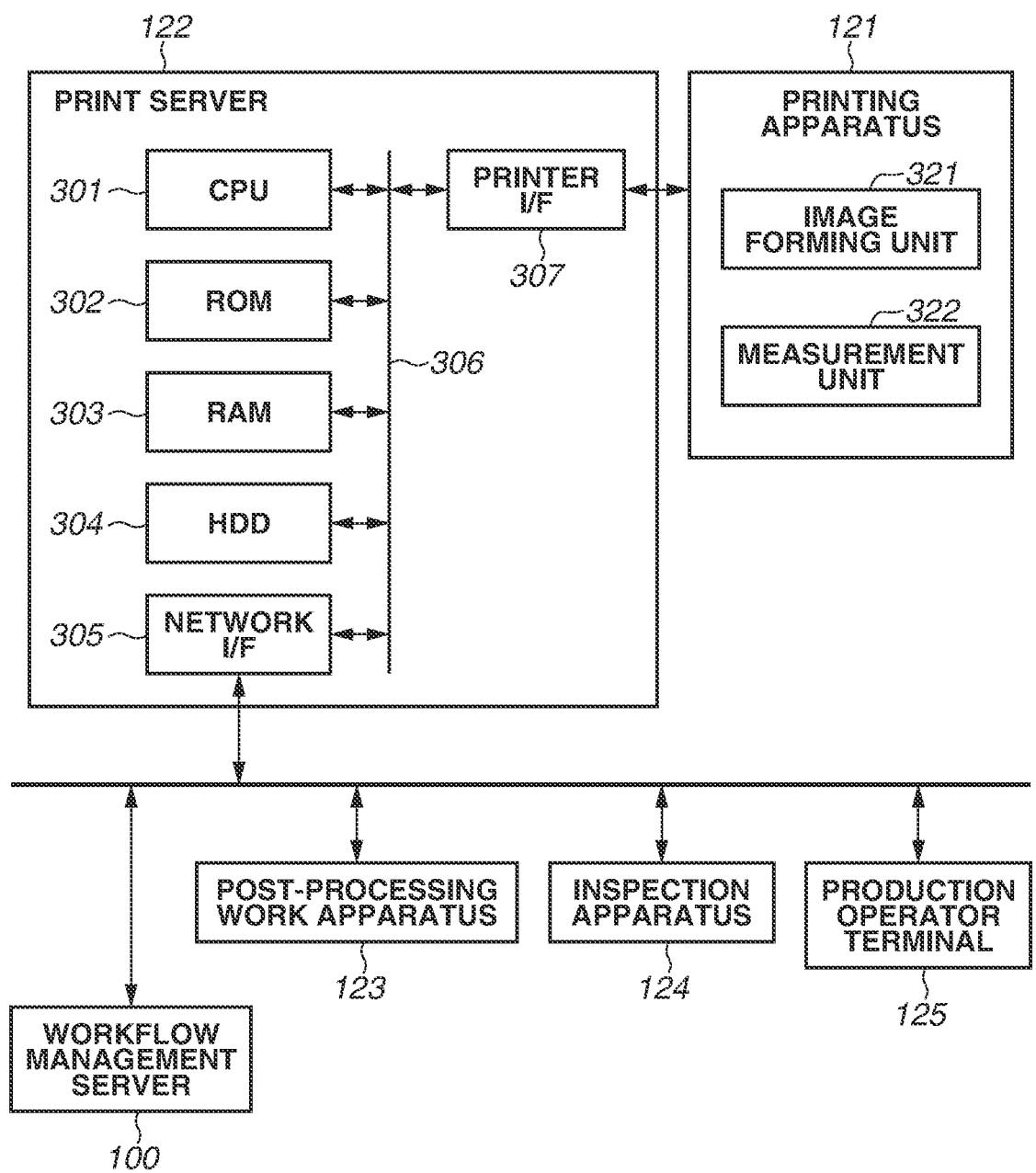

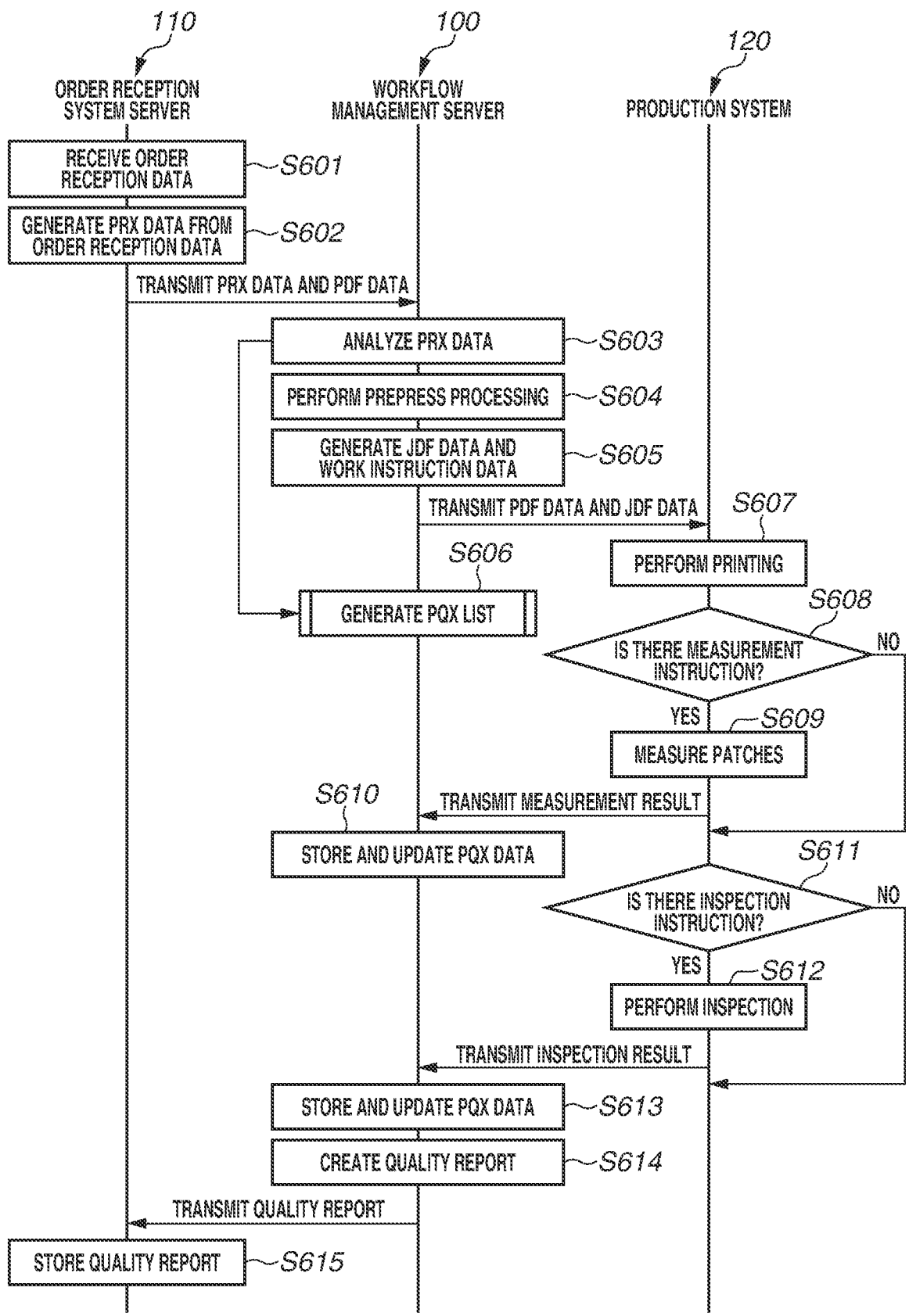

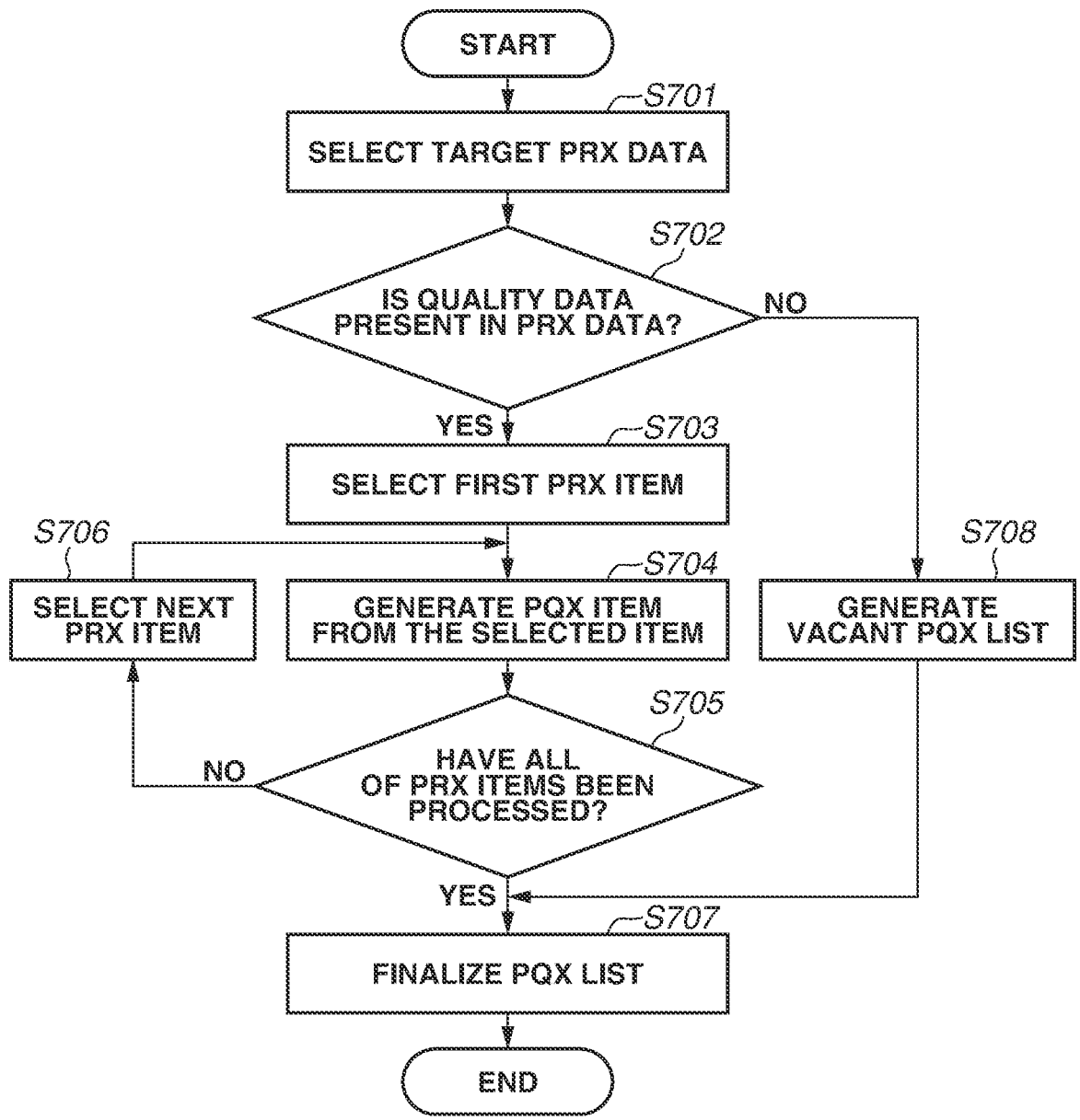

FIG.8

| | Quality | Name | Sampling Position | [Col] Type | [Col] CxFReferenceObjectIdLink | Score |
|---|---|---|---|---|---|---|
| 1 | Color | BabyCheek | XX01 | Build (Patch) | YY01 | dE00 < 3.0 |
| 2 | Color | JapanColor | XX02 | JP01 (Chart) | YY02 | dE00 < 5.0 |
| 3 | Barcode | QRCode | XX11 | — | — | ISOVerification = PASS |
| 4 | Registration | XMaxOffset | XX21 | — | — | 0.1 mm |
| 5 | Registration | YMaxOffset | XX22 | — | — | 0.2 mm |

| | Report | Name | PositionOnSample | Result |
|---|---|---|---|---|
| 1 | ColorReport | BabyCheek | XX01 | Build (Patch) / ZZ01 |
| 2 | ColorReport | JapanColor | XX02 | JP01 (Chart) / ZZ02 |
| 3 | BarcodeReport | Barcode2DEntry | XX11 | PASS |
| 4 | RegistrationReport | VarianceReport | XX21 | Reg002 / 0.06 mm |
| 5 | RegistrationReport | VarianceReport | XX22 | Reg002 / 0.18 mm |

DETAILED QUALITY SETTING

IMAGE QUALITY SETTING

CRITERION

[ Japan Color ▽ ]

REQUIRED QUALITY VALUE

REQUIRED ΔE AVERAGE VALUE [ 4 ] OR LESS

IDEAL ΔE AVERAGE VALUE [ 3 ] OR LESS

IMPORTANT QUALITY ITEM SETTING

☐ BARCODE ACCURACY
☑ REGISTRATION ACCURACY
☑ IMAGE QUALITY
☐ IMAGE DEFECT

DETAILED QUALITY SETTING

IMAGE QUALITY SETTING

CRITERION

[ Japan Color ▽ ]

☐ REQUIRED ΔE 3 OR LESS
☐ REQUIRED ΔE 5 OR LESS
☐ REQUIRED ΔE 10 OR LESS

IMPORTANT QUALITY ITEM SETTING

☐ BARCODE ACCURACY
☑ REGISTRATION ACCURACY
☑ IMAGE QUALITY
☐ IMAGE DEFECT

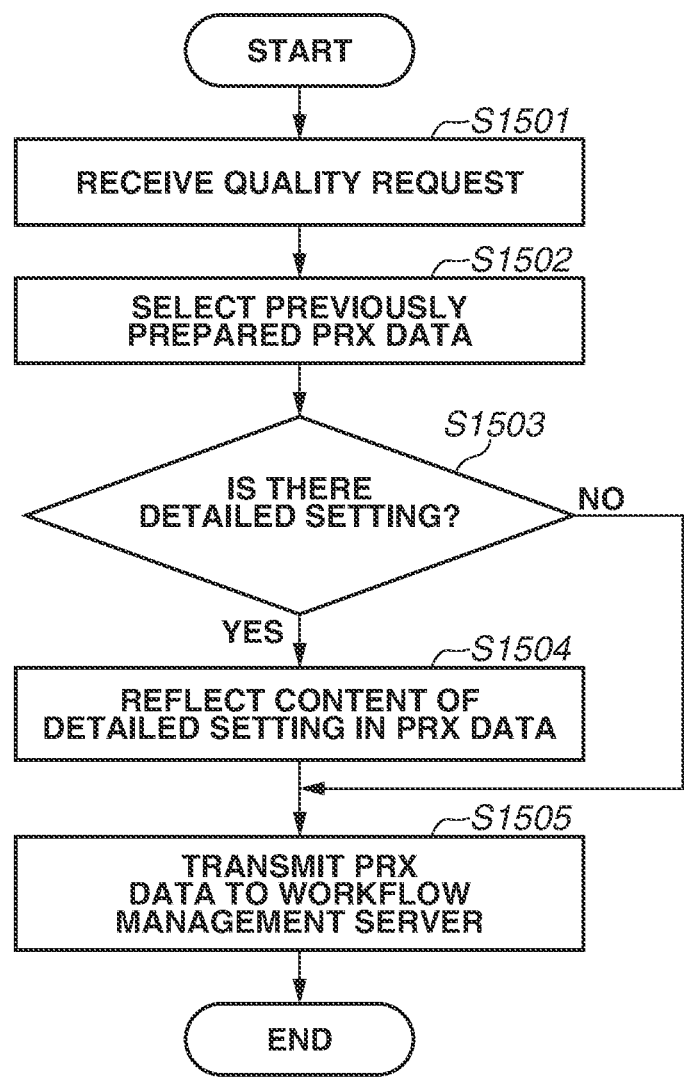

FIG.16

- PrintRequirementsMessage
    - MessageInfo
    - BusinessInfo
    - QualitySpec
        - QualitySpecName/QualitySpecVersion
        - *Specifier
        - CustomerJobType/CustomerItemId
        - BasisOfCalculation
            - WeightedPercentage
            - Formula
        - OverallGradingScale
            - Grade
            - ZeroBaseline
        - MinimumAcceptableRank
        - *DesiredRank
        - QualityParameterSet
            - ParameterSetType/Name/Id
            - *WeightingFactor
            - ParameterSetScoringScale
            - MinimumAcceptableRank/*DesiredRank
            - *RequiredCompliance
            - *RequiredSamplingPositions
    - *CxFReferenceData
    - *SamplingPositionImageData
    - *TagCollection/*CustomResources

FIG.17

PRX DATA FOR PHOTO BOOK ─1701

```
<PRX>
    <QualityParameterSet>
        <QualityParameterSetName> Color Variation Inspection </QualityParameterSetType>
        <QualityParameterSetType> Color </QualityParameterSetType>
        <ParameterSetScoringScale>
            <Score>
                <DisplayLabel> RankColor1 </DisplayLabel>
                <Rank> Rank:1 </Rank>
                <ValueRange> ΔE Average 4 or More </ValueRange>
            </Score>
            <Score>
                <DisplayLabel> RankColor2 </DisplayLabel>
                <Rank> Rank:2 </Rank>
                <ValueRange> ΔE Average Less than 4 and 3 or More </ValueRange>
            </Score>
            <Score>
                <DisplayLabel> RankColor3 </DisplayLabel>
                <Rank> Rank:3 </Rank>
                <ValueRange> ΔE Average Less than 3 </ValueRange>
            </Score>
        </ParameterSetScoringScale>
        <MinimumAcceptableRank> Rank:2 </MinimumAcceptableRank>
    </QualityParameterSet>
</PRX>
```

EDITED PRX DATA ─1702

```
<PRX>
    <QualityParameterSet>
        <QualityParameterSetName> Color Variation Inspection </QualityParameterSetType>
        <QualityParameterSetType> Color </QualityParameterSetType>
        <ParameterSetScoringScale>
            <Score>
                <DisplayLabel> RankColor1 </DisplayLabel>
                <Rank> Rank:1 </Rank>
                <ValueRange> ΔE Average 3 or More </ValueRange>
            </Score>
            <Score>
                <DisplayLabel> RankColor2 </DisplayLabel>
                <Rank> Rank:2 </Rank>
                <ValueRange> ΔE Average Less than 3 and 2 or More </ValueRange>
            </Score>
            <Score>
                <DisplayLabel> RankColor3 </DisplayLabel>
                <Rank> Rank:3 </Rank>
                <ValueRange> ΔE Average Less than 2 </ValueRange>
            </Score>
        </ParameterSetScoringScale>
        <MinimumAcceptableRank> Rank:2 </MinimumAcceptableRank>
        <DesiredRank> Rank:3 </DisplayRank>
    </QualityParameterSet>
</PRX>
```

FIG.18

PRX DATA FOR PHOTO BOOK      1801

```
<PRX>
    <BasisOfCalculation>
        TotalRank = Rank (Color Variation Inspection)*0.6 + Rank (Scattering Inspection)*0.3
    </BasisOfCalculation>
</PRX>
```

EDITED PRX DATA      1802

```
<PRX>
    <BasisOfCalculation>
        TotalRank = Rank (Color Variation Inspection)*0.6 + Rank (Scattering Inspection)*0.1
    </BasisOfCalculation>
</PRX>
```

JOB PROCESSING SYSTEM, CONTROL METHOD FOR JOB PROCESSING SYSTEM, AND STORAGE MEDIUM FOR NOTIFYING OF A QUALITY OF A RESULTANT PRODUCT

BACKGROUND

Field of the Disclosure

Aspects of the present disclosure generally relate to a job processing system, a control method for a job processing system, and a storage medium.

Description of the Related Art

There are forms of printing services called print on demand (POD), production printing, and commercial printing. In such service forms, there exist a customer (also referred to as an "end user") who orders or requests printing and a printing company which provides a printing resultant product, and the customer provides, to the printing company, specifications of a printing resultant product which the customer requests and image data which is to be used for printing as needed, thus ordering a printed product. The specifications of a printing resultant product serve as a factor for determining the content of a printing resultant product, such as the type of paper for use in printing, finishing settings of, for example, bookbinding or stapling, the number of printed sheets, or the number of copies. The printing company generates a printing resultant product using the requested content and image data and delivers the printing resultant product to the customer.

In such a commercial printing service, the printing company uses a variety of equipment and software to perform operations starting with reception of an order for a printing resultant product and ending with delivery of the printing resultant product. For example, such a variety of equipment and software include a printing apparatus which is used to perform printing on sheets of paper, a finisher which is used to perform bookbinding or stapling, and an inspection apparatus which is used to perform examination or inspection of a printed product. Besides, such a variety of equipment and software include a web server which is used to receive an order for a printing resultant product from the customer and a terminal and software which are used to manage production of a printing resultant product. Moreover, there exists a plurality of users who uses such a variety of equipment and software. For example, such a plurality of users includes a person in charge of reception of an order who performs management of cases of reception of orders and communicates with customers, a process designer who designs a working process aiming at completing a printing resultant product, an operator which performs an operation on the printing apparatus or the inspection apparatus, and a confirming person who confirms the quality of a final printing resultant product. There also exists a printing company which includes a plurality of production bases, and, in such a case, the printing company determines which production base to use for production of a printing resultant product based on the content of reception of an order.

In a commercial printing service, a printing company often receives, from a customer, a designation of conditions of quality with respect to a printing resultant product. The conditions of quality refer to, unlike specifications of a printing resultant product, conditions related to the quality of a printing resultant product, such as the amount of a positional misregistration between respective images on the obverse and reverse surfaces of paper, color values of, for example, images or logos present in a printing resultant product, and the amount of variation of color values of images between a plurality of copies or a plurality of pages. Since the printing resultant product includes a wide variety of printing resultant products, such as products for distribution such as flyers or brochures, photograph collections, books, name cards (business cards), and exhibition panels and has various use applications and prices, the conditions of quality include a wide variety of conditions and levels which are requested.

To satisfy the conditions of quality, the printing company is required to have a working process and a quality confirmation process for a printing resultant product.

The working process refers to adjustment work for various apparatuses, which is required to satisfy the conditions of quality. For example, color adjustment work for matching a specific color on specific paper in the printing apparatus based on a result of sample printing about which an agreement with a customer has been obtained is required. Alternatively, if the condition is that a misregistration of printing on the obverse and reverse surfaces of a sheet of paper in a printing resultant product falls within a predetermined range, adjustment work for image printing positions is required. Additionally, the working process also includes adjustment result confirmation work for confirming the state of an apparatus which has been adjusted by these adjustment work operations.

On the other hand, the quality confirmation process refers to a process for confirming whether the produced printing resultant product satisfies the conditions of quality. For example, inspection work which is performed after completion of printing determines that a printing resultant product which does not satisfy the conditions of quality is a defective product and then eliminates the printing resultant product. The inspection work may be an inspection which is directly performed by a confirming person or may be an inspection which is automatically performed by an inspection apparatus. Moreover, as needed, the quality confirmation process generates a quality report indicating that a printing resultant product satisfies the conditions of quality to a customer.

Each of the above-mentioned processes is determined by a process designer according to the type and printing conditions of a printing resultant product. As mentioned above, the commercial printing service handles a wide variety of forms of printing resultant products. Additionally, the printing company often possesses a plurality of types of apparatuses, and the process designer assumes work for selecting the most appropriate apparatus from those apparatuses and then reflecting the selected apparatus in each process. Therefore, the process designer is required to have a high skill and empirical value, and is subjected to high workload.

Information about the conditions of quality and information about a quality confirmation result, which are considered to be required for the above-mentioned process design or quality report generation, have not conventionally been defined by a standardized information format. Therefore, the printing company, which receives orders, has to receive the conditions of quality in different information formats from a plurality of customers, so that there is an obstacle in designing a work process. Moreover, even in terms of customers who place orders, when a customer places orders for printing resultant products with a plurality of printing companies, there is a cumbersome operation in which the customer has to perform delivery and receipt of the conditions of quality and the quality report in different information formats.

Therefore, as a method for standardizing an information format for transferring the conditions of quality and the quality report, PRX and PQX have been being studied. PRX is an abbreviation for Print Requirement eXchange format, and refers to a standard data format for the conditions of quality which are requested from printing. Using PRX enables describing the conditions of quality which are required for different customers or different orders in a unified standard data format. PQX is an abbreviation for Print Quality eXchange format, and refers to a standard data format for print quality reports. Using PQX enables transferring quality data for a printing resultant product in a standard data format. In this way, using PRX and PQX enables transferring the conditions of quality and a quality report, which have not conventionally been standardized, in a standardized information format.

Moreover, as a technique related to build-out of a workflow concerning reception of an order for a printing resultant product, there is a technique discussed in Japanese Patent Application Laid-Open No. 2008-009863. The technique discussed in Japanese Patent Application Laid-Open No. 2008-009863 searches for processes from a database in which process definitions of respective processes constituting a workflow for satisfying specifications of a printing resultant product are registered. Then, the technique discussed in Japanese Patent Application Laid-Open No. 2008-009863 combines the found processes to build out a workflow capable of producing order reception conditions of a printing resultant product. At this time, the technique discussed in Japanese Patent Application Laid-Open No. 2008-009863 presents, to a customer, workflows in which the order reception conditions are different together with necessary costs, thus being able to present discount information to the customer. This enables the customer to select a desired workflow by making a comparison of specifications and costs between a plurality of workflows in which costs are different.

The conditions of quality which customers request are of great variety, and items about which customers want to know the quality of each resultant product are also of great variety.

In the case of generating a report in which quality confirmation results are collectively described, a conventional technique is not able to identify, for each job, about which item a quality confirmation result is required.

SUMMARY

According to embodiments of the present disclosure, a job processing system which causes a job processing apparatus to execute a job includes a reception unit configured to receive quality request data, an identification unit configured to identify, based on the quality request data received by the reception unit, an item a notification of which is to be issued as a quality of a resultant product which is obtained by executing the job from among a plurality of items concerning quality, and a notification unit configured to issue a notification of a quality of the resultant product with respect to the item identified by the identification unit.

Further features of the present disclosure will become apparent from the following description of exemplary embodiments with reference to the attached drawings.

BRIEF DESCRIPTION OF THE DRAWINGS

FIG. 4 is a block diagram illustrating a hardware configuration of a production system according to the present exemplary embodiment.

FIG. 6 is a sequence diagram illustrating software processing according to the present exemplary embodiment.

FIG. 7 is a flowchart illustrating processing for generating a Print Quality eXchange (PQX) list according to the present exemplary embodiment.

FIG. 8 is a diagram illustrating an example of a Print Requirement eXchange (PRX) database according to the present exemplary embodiment.

FIG. 9 is a diagram illustrating an example of a PQX database according to the present exemplary embodiment.

FIGS. 14A and 14B are diagrams illustrating examples of UIs for setting a detailed print quality request according to the present exemplary embodiment.

FIG. 15 is a flowchart illustrating software processing according to the present exemplary embodiment.

FIG. 16 is an outline diagram of PRX data according to the present exemplary embodiment.

FIG. 17 is a diagram illustrating examples of editing of PRX data for each condition of quality according to the present exemplary embodiment.

FIG. 18 is a diagram illustrating examples of editing of calculating formulae for quality calculation of the entire printing resultant product according to the present exemplary embodiment.

DESCRIPTION OF THE EMBODIMENTS

Various exemplary embodiments, features, and aspects of the disclosure will be described in detail below with reference to the drawings. Furthermore, the following exemplary embodiment is not intended to limit the disclosure, and not all of the combinations of characteristics described in the following exemplary embodiment are necessarily essential for solutions in the disclosure.

<Outline of Entire Printing System>

Figure 1:
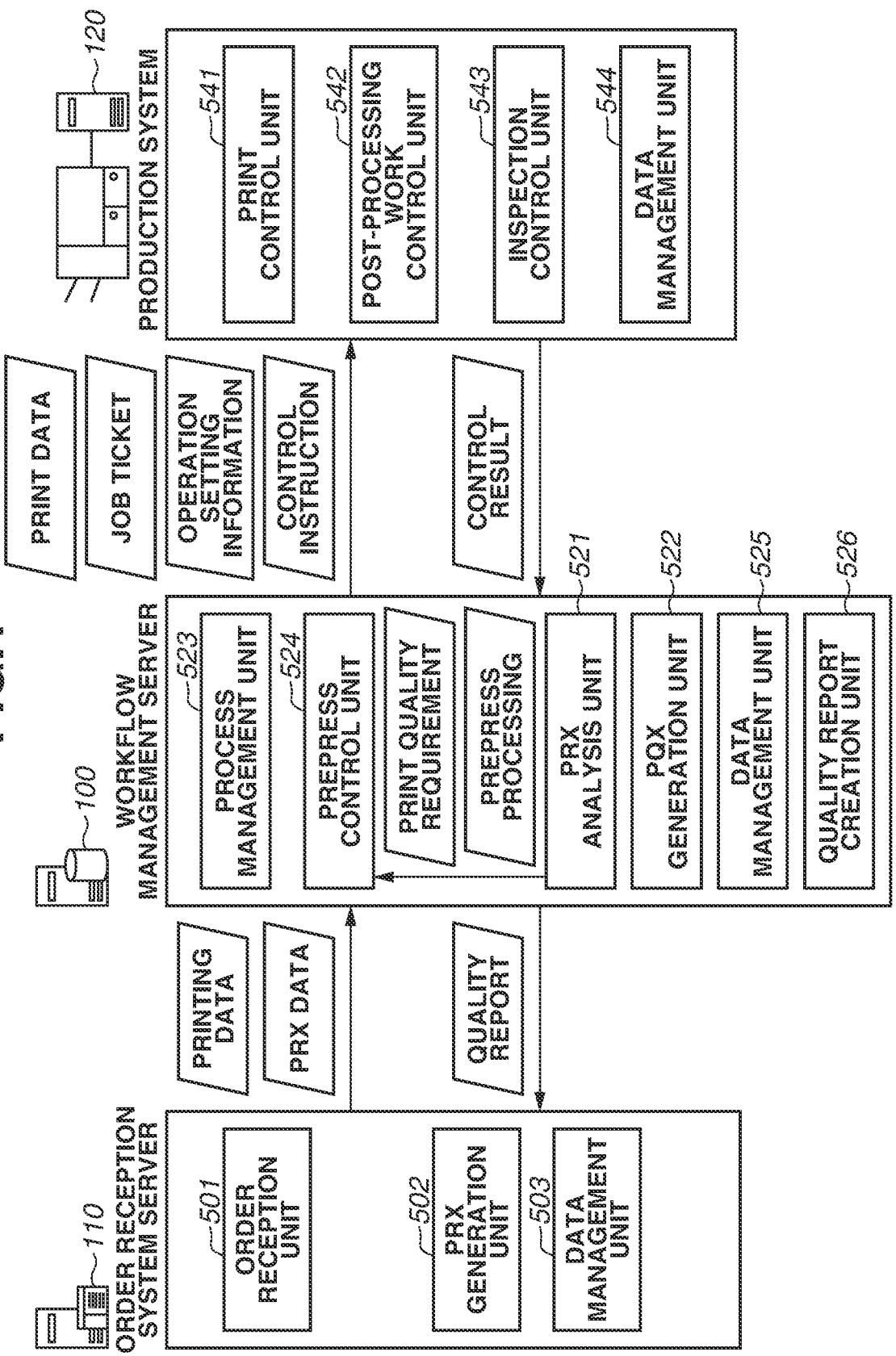
FIG. 1 is an entire outline diagram illustrating an overview of a printing system according to an exemplary embodiment of the present disclosure.

FIG. 1 is an entire outline diagram illustrating an overview of a printing system, which is an example of a job processing system according to an exemplary embodiment of the present disclosure.

Functions of the respective apparatuses and details of operations of the printing system are described in detail below with reference to FIG. 2 and subsequent figures. In FIG. 1, an item in each rhombus represent data.

A PRX analysis unit 521 of a workflow management server 100 analyzes PRX data generated by an order reception system server 110, and the workflow management server 100 transmits print data, a job ticket, operation setting information, and a control instruction, which are based on an analysis result obtained by the PRX analysis unit 521, to a production system 120. Furthermore, PRX is an abbreviation for Print Requirement eXchange format, and refers to a standard data format for the conditions of quality which are requested from printing. Using PRX enables describing the conditions of quality which are required for different customers or different orders in a unified standard data format. The production system 120 performs job processing according to the received print data, job ticket, operation setting information, and control instruction. Details of configurations of the respective apparatuses are described below.

The present exemplary embodiment is characterized by the workflow management server 100 generating a list of items in target PQX data while interpreting PRX data. PQX is an abbreviation for Print Quality eXchange format, and refers to a standard data format for print quality reports. Using PQX enables transferring quality data for a printing resultant product in a standard data format. In this way, using PRX and PQX enables transferring the conditions of quality and a quality report, which have not conventionally been standardized, in a standardized information format.

<Configuration of Entire System>

Figure 2:
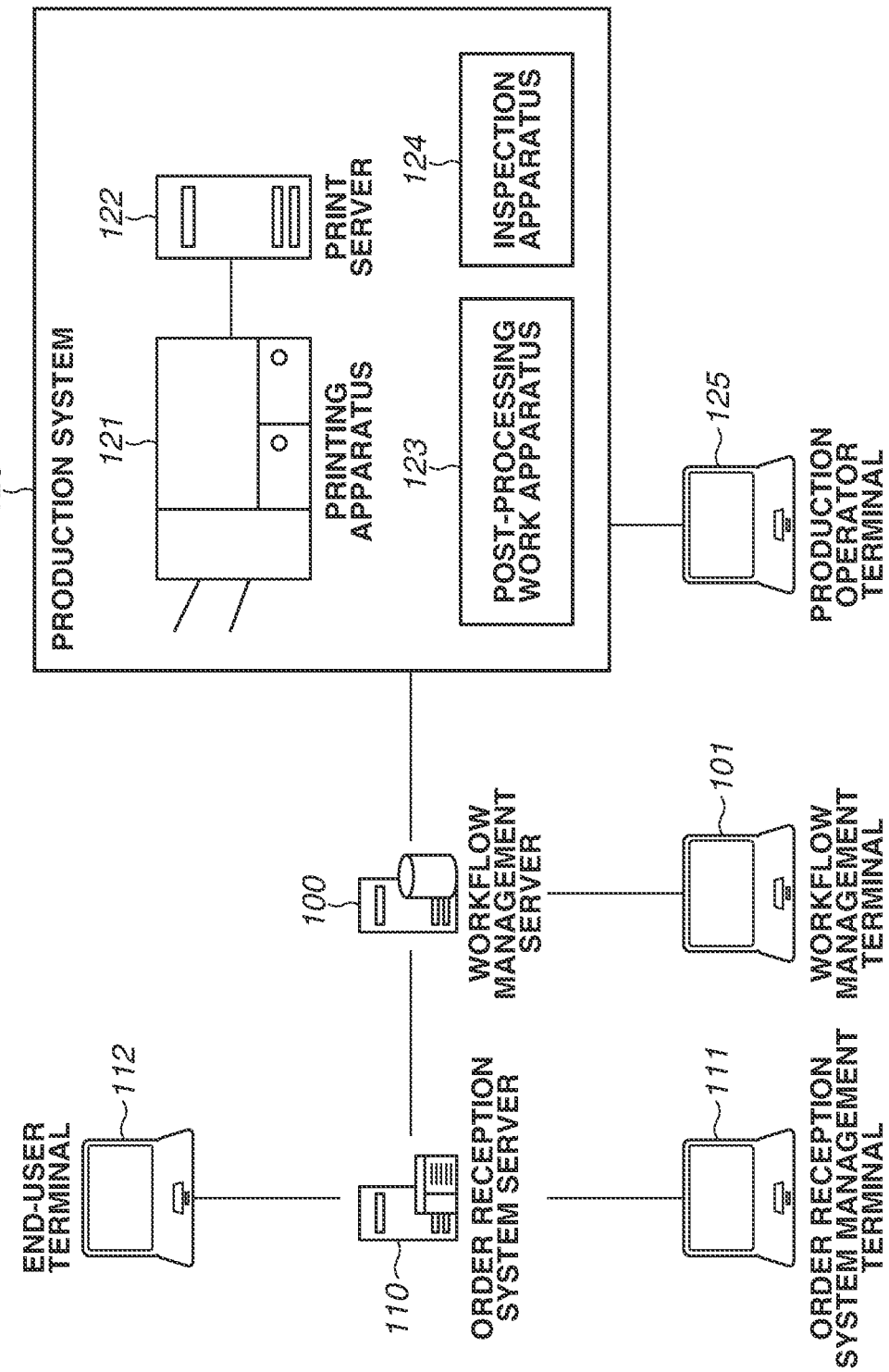
FIG. 2 is a conceptual diagram illustrating the system according to the present exemplary embodiment.

FIG. 2 is a diagram illustrating a configuration of a commercial printing system according to the present exemplary embodiment.

The workflow management server 100 is an apparatus which manages the entire workflow with respect to commercial products for commercial printing.

The workflow management server 100 receives print data and PRX data, which is quality condition information, from the order reception system server 110. Then, the workflow management server 100 analyzes PRX data received from the order reception system server 110, and performs, for each ordered job, for example, determination of the production system 120 and prepress processing of print data. Additionally, the workflow management server 100 generates a PQX item list based on a result obtained by analyzing PRX data. Moreover, the workflow management server 100 generates data which serves as a processing object for the production system 120 (print data, a job ticket, operation setting information, and a control instruction illustrated in FIG. 1), and transmits the generated data to respective devices which constitute the production system 120. Devices which constitute the production system 120 are described below.

Then, the workflow management server 100 receives various control results from the production system 120 to create a quality report. The workflow management server 100 transmits the created quality report to the order reception system server 110.

Furthermore, while, in the description of the present exemplary embodiment, the workflow management server 100 is assumed to be an on-premise server installed at a management base which performs workflow management, the present exemplary embodiment is not limited to this. Another exemplary embodiment can be configured in such a manner that the workflow management server 100 is built out as a cloud server and a workflow management terminal 101 described below connects to the workflow management server 100 via the Internet. The same also applies to the order reception system server 110 described below.

The workflow management terminal 101 is a terminal which a workflow administrator operates, and connects to the workflow management server 100 via a network to perform various functions. Specifically, the workflow management terminal 101 performs, for example, changing of settings of the workflow management function and confirmation of states of respective devices of the production system 120.

The order reception system server 110 is an apparatus which manages a system for receiving orders from end users with respect to commercial products for commercial printing. The order reception system server 110 generates printing data and PRX data according to an ordered commercial product or an order content received from an end user, and transmits the generated printing data and PRX data to the workflow management server 100.

An order reception system management terminal 111 is a terminal which an administrator of the order reception system operates, and connects to the order reception system server 110 via a network to perform various functions. Specifically, the order reception system management terminal 111 performs functions such as setting of required quality for each commercial product, confirmation of a status of each ordered job, and viewing of appearance quality information about a resultant product for each ordered job.

An end-user terminal 112 is a terminal which an end user operates, and connects to the order reception system server 110 via a network. Then, the end-user terminal 112 receives, from the end user, instructions for, for example, selection of a commercial product, transmission of original data, and placement of an order via a user interface (UI) such as a web browser, and transmits the instructions to the order reception system server 110.

The production system 120 is a system which is configured to produce a commercial product (a resultant product) in commercial printing for which an order has been received from the end user. More specifically, the production system 120 is configured with apparatuses such as a printing apparatus 121, a print server 122, which controls the printing apparatus 121, a post-processing work apparatus 123, and an inspection apparatus 124.

The printing apparatus 121 and the print server 122 are connected to each other via a network or a dedicated interface.

In the description of the present exemplary embodiment, the post-processing work apparatus 123 and the inspection apparatus 124 are assumed to have a near-line configuration to connect to other devices via a network. However, the present exemplary embodiment is not limited to this, and each of the post-processing work apparatus 123 and the inspection apparatus 124 can be configured to have an off-line configuration to act solely. In the case of the off-line configuration, each of the post-processing work apparatus 123 and the inspection apparatus 124 connects to an operation terminal (not illustrated) which is able to connect to a network, thus connecting to the network via the operation terminal. In either case, each of the post-processing work apparatus 123 and the inspection apparatus 124 connects to the workflow management server 100 via a network and performs transmission and reception of various pieces of information therewith.

Furthermore, the production system 120 may be configured not to include any one or all of the print server 122, the post-processing work apparatus 123, and the inspection apparatus 124.

The printing apparatus 121 is an apparatus which performs print processing based on data and an instruction transmitted from the workflow management server 100. The printing method is not particularly limited and can be any one of an electrophotographic method, an inkjet method, and other printing methods.

The administrator or operator of the production system 120 is able to issue an instruction for control concerning printing via a UI of the printing apparatus 121.

The print server 122 is a server which controls the printing apparatus 121. As with a general printing system, the administrator or operator of the production system 120 is able to issue an instruction for control concerning printing via a UI of the print server 122.

Furthermore, while, in the description of the present exemplary embodiment, the print server 122 is assumed to include a color management unit (not illustrated), the present exemplary embodiment is not limited to this. For example, a configuration in which a color management server (not illustrated), which is able to connect to the print server 122 and the printing apparatus 121 via a network, is separately installed and processing concerning color management is performed by the color management server can be employed.

The post-processing work apparatus 123 is an apparatus which is configured to apply post-processing work to printed sheets or a stack of printed sheets. For example, the post-processing work apparatus 123 performs creasing or folding of sheets or cutting or bookbinding processing of a stack of sheets.

The inspection apparatus 124 is an apparatus which performs processing for detecting any defect with respect to a final resultant product or an intermediate resultant product and then issuing a notification of the defect to the user or eliminating the resultant product from a production line.

The production operator terminal 125 is an apparatus which the operator who operates the above-mentioned various devices of the production system 120 uses. The production operator terminal 125 has functions for the operator to, for example, check the operational status of each device or check error information output at the time of occurrence of an abnormality. Another configuration in which not an external terminal but a UI operation unit included in each device assumes these functions can be employed.

<Hardware Configurations>

Next, hardware configurations of the respective apparatuses according to the present exemplary embodiment are described.

Figure 3:
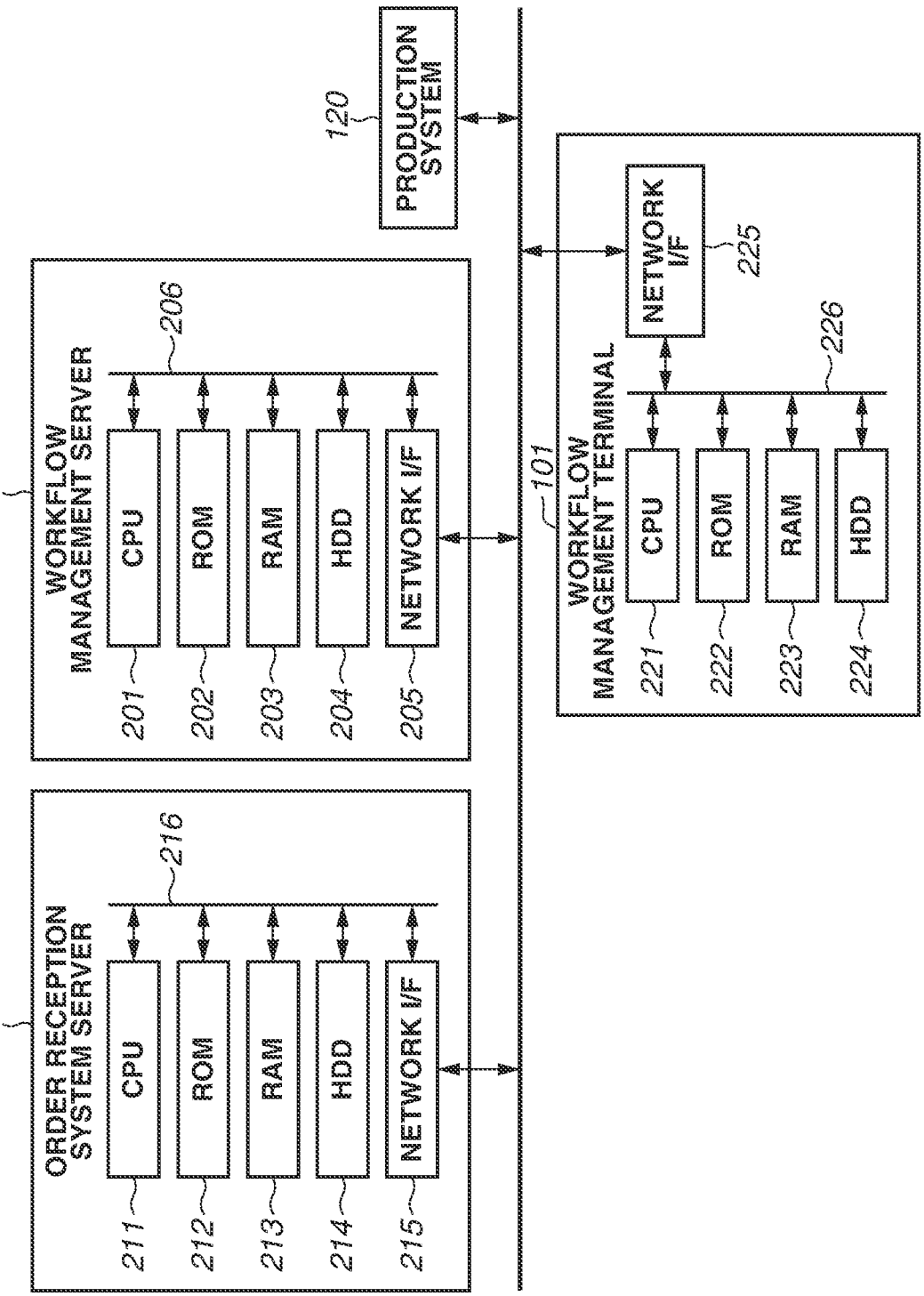
FIG. 3 is a block diagram illustrating a hardware configuration of a workflow management system according to the present exemplary embodiment.

FIG. 3 is a block diagram illustrating a hardware configuration of the workflow management system, including the workflow management server 100 and the workflow management terminal 101.

First, a hardware configuration of the order reception system server 110 is described.

A central processing unit (CPU) 211 comprehensively controls access to various devices connected thereto via a system bus 216 by loading a control program stored in a read-only memory (ROM) 212 or a hard disk drive (HDD) 214 onto a random access memory (RAM) 213 and executing the loaded control program. The ROM 212 stores, for example, a control program which the CPU 211 is able to execute. The RAM 213 mainly functions as, for example, a main memory or a work area for the CPU 211, and is configured to be able to enhance a memory capacity with an option RAM 213 which is connected to an expansion port (not illustrated. The HDD 214 stores, for example, a boot program, various applications, font data, user files, and editing files. Furthermore, while, in the present exemplary embodiment, the HDD 214 is used, besides an HDD, for example, a Secure Digital (SD) card or a flash memory can be used as an external storage device. The same also applies to an apparatus including an HDD described below. A network interface (I/F) 215 is used to perform data communication with various apparatuses via a network.

Next, a hardware configuration of the workflow management server 100 is described.

A CPU 201 comprehensively controls access to various devices connected thereto via a system bus 206 by loading a control program stored in a ROM 202 or an HDD 204 onto a RAM 203 and executing the loaded control program. The ROM 202 stores, for example, a control program which the CPU 201 is able to execute. The RAM 203 mainly functions as, for example, a main memory or a work area for the CPU 201, and is configured to be able to enhance a memory capacity with an option RAM 203 which is connected to an expansion port (not illustrated. The HDD 204 stores, for example, a boot program, various applications, font data, user files, and editing files. Furthermore, while, in the present exemplary embodiment, the HDD 204 is used, besides an HDD, for example, an SD card or a flash memory can be used as an external storage device. The same also applies to an apparatus including an HDD described below. A network I/F 205 is used to perform data communication with various apparatuses via a network.

Next, a hardware configuration of the workflow management terminal 101 is described.

A CPU 221 comprehensively controls access to various devices connected thereto via a system bus 226 by loading a control program stored in a ROM 222 or an HDD 224 onto a RAM 223 and executing the loaded control program. The ROM 222 stores, for example, a control program which the CPU 221 is able to execute. The RAM 223 mainly functions as, for example, a main memory or a work area for the CPU 221, and is configured to be able to enhance a memory capacity with an option RAM 223 which is connected to an expansion port (not illustrated. The HDD 224 stores, for example, a boot program, various applications, font data, user files, and editing files. A network I/F 225 is used to perform data communication with various apparatuses via a network.

Furthermore, the hardware configuration of each of the other terminal apparatuses, such as the order reception system management terminal 111, the end-user terminal 112, and the production operator terminal 125, is similar to that of the workflow management terminal 101 and is, therefore, omitted from description.

FIG. 4 is a block diagram illustrating a hardware configuration of the production system 120 according to the present exemplary embodiment.

A CPU 301 comprehensively controls access to various devices connected thereto via a system bus 306 by loading a control program stored in a ROM 302 or an HDD 304 onto a RAM 303 and executing the loaded control program. The ROM 302 stores, for example, a control program which the CPU 301 is able to execute. The RAM 303 mainly functions as, for example, a main memory or a work area for the CPU 301, and is configured to be able to enhance a memory capacity with an option RAM 303 which is connected to an expansion port (not illustrated. The HDD 304 stores, for example, a boot program, various applications, font data, user files, and editing files. A network I/F 305 is used to perform data communication with various apparatuses via a network.

A printer I/F 307 controls outputting of an image to an image forming unit 321 of the printing apparatus 121. Moreover, the printer I/F 307 controls a measurement unit 322 included in the printing apparatus 121 and thus receives a measurement result from the measurement unit 322.

The printing apparatus 121 includes at least the image forming unit 321, which assumes a printing operation, and the measurement unit 322 described below. Besides, a configuration in which a paper feed device (not illustrated) or an in-line post-processing device (not illustrated) is connected to the printing apparatus 121 can be employed.

The image forming unit 321 outputs printing data to a sheet of paper. The hardware configuration of the image forming unit 321 is the same as that of a general printing apparatus 121.

The measurement unit 322 measures a printed product generated by the image forming unit 321 according to an instruction from the print server 122 or the printing apparatus 121 itself. The measurement method is a known measurement method such as spectral colorimetry, density measurement, charge-coupled device (CCD) sensor scan, or contact image sensor (CIS) scan. Furthermore, while, in the description of the present exemplary embodiment, the measurement unit 322 is provided inside the printing apparatus 121, the present exemplary embodiment is not limited to this. A configuration in which the measurement unit 322 is connected to a network in a stand-alone manner independently from the printing apparatus 121 can be employed. Alternatively, the measurement unit 322 is connected to an operation terminal (not illustrated) which is able to connect to a network and is thus connected to the network via the operation terminal. In either case, the measurement unit 322 connects to the workflow management server 100 via a network and performs transmission and reception of various pieces of information with respect to the workflow management server 100.

<Software Configurations>

Next, software configurations of the respective apparatuses according to the present exemplary embodiment are described.

Figure 5A:
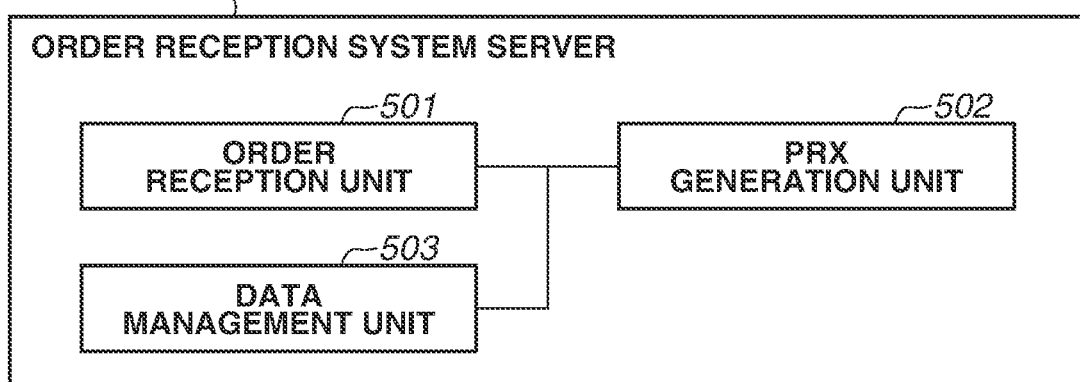
FIGS. 5A, 5B, and 5C are software configuration diagrams of various apparatuses according to the present exemplary embodiment.

FIG. 5A is a block diagram illustrating a software configuration of the order reception system server 110 according to the present exemplary embodiment. Software modules illustrated in FIG. 5A are stored as a program in an HDD (not illustrated), and are implemented by a CPU (not illustrated) loading the program onto a RAM (not illustrated) and executing the program.

An order reception unit 501 receives order information about a commercial product from the end-user terminal 112 via a network. The order information includes, for example, information about a type of the commercial product, image data which has input as an original, and information about the requested quality. Furthermore, while, in the description of the present exemplary embodiment, for example, Portable Document Format (PDF) data is used as the input data, the present exemplary embodiment is not limited to this. A configuration in which different general format image data which is able to be interpreted by the production system 120 is handled can be employed.

A PRX generation unit 502 analyzes order information received by the order reception unit 501 to generate PRX data. Moreover, the PRX generation unit 502 transmits the generated PRX data to the workflow management server 100.

A data management unit 503 records thereon information such as order information and PRX data. Moreover, the data management unit 503 transmits the input image data, commercial product type information, and PRX data to the workflow management server 100. Additionally, the data management unit 503 performs transmission and reception of other pieces of data with respect to various apparatuses.

Figure 5B:
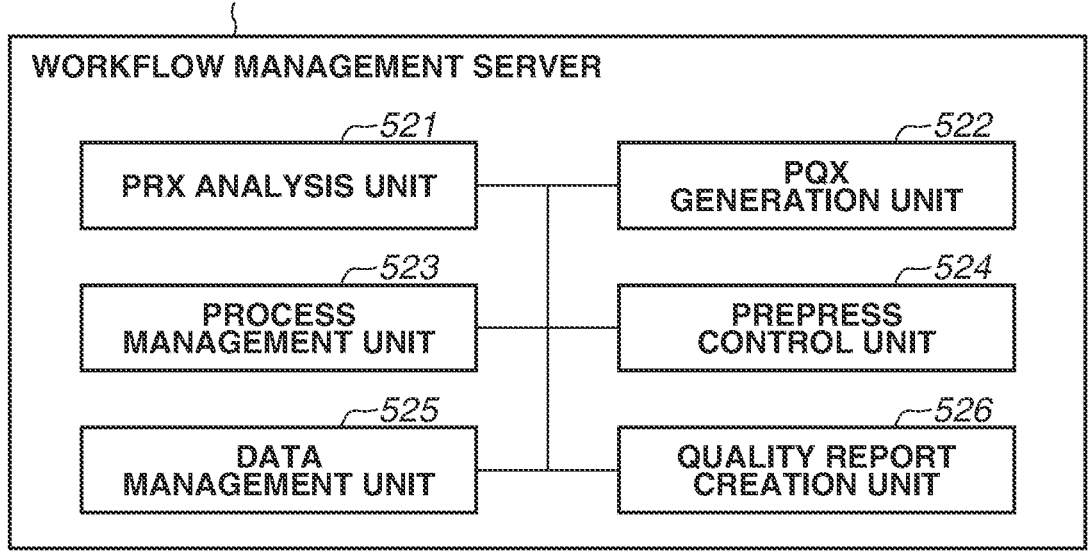

FIG. 5B is a block diagram illustrating a software configuration of the workflow management server 100 according to the present exemplary embodiment. Software modules illustrated in FIG. 5B are stored as a program in the HDD 204, and are implemented by the CPU 201 loading the program onto the RAM 203 and executing the program.

A PRX analysis unit 521 analyzes PRX data received from the order reception system server 110 to identify a print quality requirement and a part of required prepress processing. For example, the print quality requirement is a requirement in which an average color difference obtained from a measurement result about predetermined color patches falls within a specific criterion.

Moreover, the prepress processing is processing for, for example, adding a color patch image, which serves as a colorimetric object in color quality confirmation processing, to, for example, a white space portion of image data.

Additionally, the PRX analysis unit 521 transmits analysis result information to a PQX generation unit 522. The analysis result information refers to item information about a print quality requirement designated by PRX data.

The PQX generation unit 522 generates a list obtained by collecting PQX items required for a target print job, based on PRX analysis result information transmitted from the PRX analysis unit 521. Details of the PQX generation unit 522 are described below.

Additionally, the PQX generation unit 522 stores information about each result of quality confirmation, an instruction for which has been issued to the production system 120 by a process management unit 523 and which has been performed by the production system 120, in the generated PQX items.

The process management unit 523 performs determination of a production system 120 which is to be used and an instruction to a prepress control unit 524 with use of commercial product type information received from the order reception system server 110 and analysis result information output from the PRX analysis unit 521.

Moreover, the process management unit 523 generates job ticket data which each device included in the production system 120 refers to. While, in the description of the present exemplary embodiment, known Job Definition Format (JDF) data is used as job ticket data as an example, the present exemplary embodiment is not limited to this. A configuration in which a different known job ticket data format, which is able to be interpreted by the production system 120, is used can be employed.

Moreover, the process management unit 523 refers to information about PRX data and generates operation setting information for the post-processing work apparatus 123 or the inspection apparatus 124.

Additionally, the process management unit 523 transmits PDF data obtained by prepress processing described below, JDF data, and operation setting information for each device to the production system 120.

The prepress control unit 524 performs prepress processing on the input image data based on an instruction received from the process management unit 523, and transmits PDF data obtained by prepress processing to the process management unit 523.

A data management unit 525 receives printing data and PRX data from the order reception system server 110. The data management unit 525 transmits, to the production system 120, PDF data, JDF data, and instruction information directed to various devices constituting the production system 120. Moreover, the data management unit 525 receives control result data from the production system 120. Additionally, the data management unit 525 transmits a quality report to the order reception system server 110. Moreover, the data management unit 525 performs transmission and reception of other pieces of data with respect to various devices.

A quality report creation unit 526 creates a quality report, which is to be transmitted to the order reception system server 110, based on PQX data generated by the PQX generation unit 522.

Figure 5C:
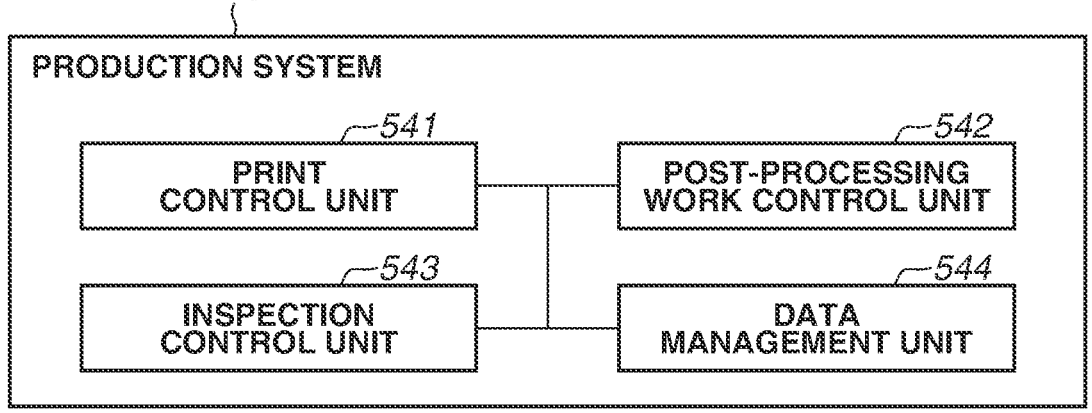

FIG. 5C is a block diagram illustrating a software configuration of the production system 120 according to the present exemplary embodiment. In various devices constituting the production system 120, software modules illustrated in FIG. 5C are stored as a program in the HDD 304, and are implemented by the CPU 301 loading the program onto the RAM 303 and executing the program. Furthermore, while the production system 120 includes the printing apparatus 121, the print server 122, the post-processing work apparatus 123, and the inspection apparatus 124, in the description of the present exemplary embodiment, the above-mentioned four pieces of hardware are deemed to be a single piece of hardware represented by the production system 120.

A print control unit 541 performs print control using information (PDF data and JDF data) received from the workflow management server 100. Moreover, the print control unit 541 also includes an adjustment function for adjusting print quality and thus performs the adjustment function according to a control instruction received from any one of the workflow management server 100, the print server 122, and the production operator terminal 125.

A data management unit 544 transmits, to the workflow management server 100, information about, for example, control results for various devices of the production system 120. Additionally, the data management unit 544 performs transmission and reception of other pieces of data with respect to various devices. Furthermore, a configuration in which the data management unit 544 is included in each device can be employed.

A post-processing work control unit 542 performs post-processing work control with the post-processing work apparatus 123 according to a control instruction received from the workflow management server 100.

An inspection control unit 543 performs inspection control with the inspection apparatus 124 according to a control instruction received from the workflow management server 100.

The inspection control unit 543 makes a comparison between image data obtained by a sensor included in the inspection apparatus 124 performing reading and image data serving as a reference. In a case where, as a result of the comparison, a difference exceeding a predetermined acceptable level has been detected, the inspection control unit 543 specifies an inspection object as a defect and performs predetermined control such as transmitting such an inspection result to the workflow management server 100 via the data management unit 544 or issuing a notification of such an inspection result to the user.

<Configuration of PRX Data>

Here, configurations of PRX data and PQX data which are used in the present exemplary embodiment are described.

Figure 10:
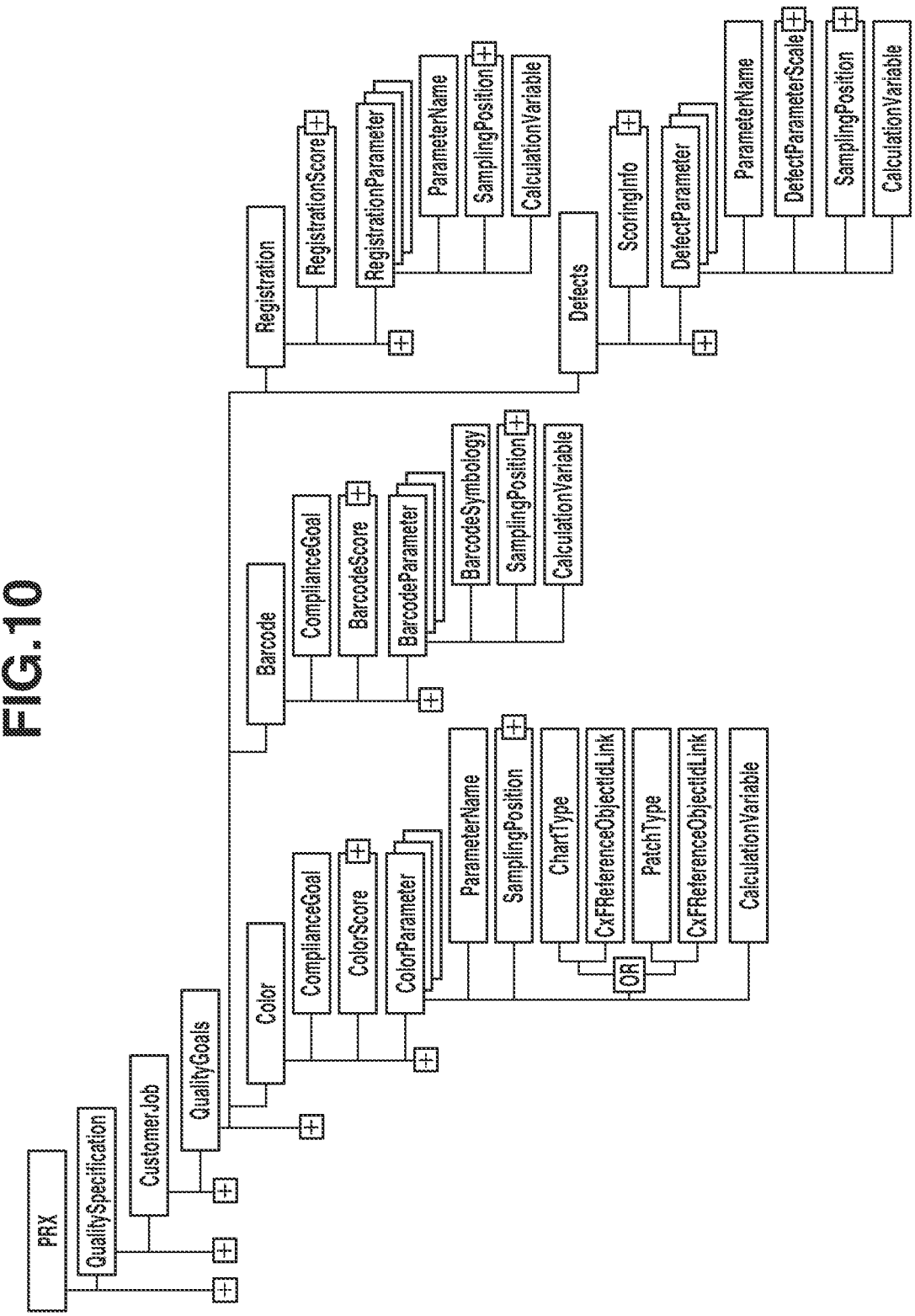
FIG. 10 is a diagram illustrating an example of a PRX configuration.

FIG. 10 is a diagram illustrating an example of configuration information about PRX data in the present exemplary embodiment. The illustrated configuration information includes only items mainly related to the present exemplary embodiment. The respective parameters and relationships between parameters illustrated in FIG. 10 are merely examples, and other items and configurations can be present as long as they are able to express pieces of information included in the respective parameters.

"PRX" indicates data described in, for example, the Extensible Markup Language (XML) text format, and is usually present one by one in association with print data. "PRX" is configured with information about demands or requests for various qualities received from the customer.

"QualitySpecification" is one of "PRX" elements. "QualitySpecification" is configured with information concerning a quality goal or an evaluation criterion with respect to an evaluation item.

"CustomerJob" is one of "QualitySpecification" elements. "CustomerJob" is configured with information concerning a print job with respect to a required quality item.

"QualityGoals" is one of "CustomerJob" elements. "QualityGoals" is configured with information concerning a goal of print quality designated by the customer. "QualityGoals" is configured with four items, i.e., "Color", "Barcode", "Registration", and "Defects" as the print quality.

"Color" is one of "QualityGoals" elements. "Color" is configured with information which is used in a case where the required quality designated by the customer is color. "Color" is configured with, for example, "ComplianceGoal", in which a goal of required quality is described, "ColorScore", in which the definition or request level of a target color is described, and "ColorParameter", which is described below.

"ColorParameter" is one of "Color" elements. "ColorParameter" describes detailed information about color patches. To address a case where there exist requests with respect to a plurality of colors in a single resultant product, a plurality of pieces of "ColorParameter" can be concurrently described. "ColorParameter" is configured with, for example, "ParameterName", in which a parameter name is described, and "SamplingPosition", in which information about a location in which a target color is drawn in print data is described. Moreover, "ColorParameter" is further configured with, for example, "PatchType", which is described in a case where a target color is a single color, or "ChartType", which is described in a case where a plurality of patch groups is targeted, and "CxFReferenceObjectIdLink", in which information about a link to information concerning patch signal values is described.

"Barcode" is one of "QualityGoals" elements. "Barcode" is configured with information which is used in a case where the required quality designated by the customer is a barcode which is to be printed in a resultant product. "Barcode" has a configuration similar to that of "Color" elements, and is configured with, for example, "BarcodeScore" in which information concerning "Barcode" is described, and "BarcodeParameter".

"Registration" is one of "QualityGoals" elements. "Registration" is configured with information which is used in a case where the required quality designated by the customer is registration such as color misregistration. "Registration" has a configuration similar to "Color" elements, and is configured with, for example, "RegistrationScore", in which information concerning color misregistration or print misregistration between obverse and reverse surfaces is described, and "RegistrationParameter".

"Defects" is one of "QualityGoals" elements. "Defects" is configured with information which is used in a case where the required quality designated by the customer is a print defect. The print defect is a state in which an expected printed result has not been obtained, and includes, for example, smear, lack, and blurring, each of which occurs due to, for example, toner leakage or fixing fault. While a request which the customer makes as an expectation is that there is always no print defect, this element is used in a case where the customer makes a high quality request in which particularly careful checking is required. "Defects" is configured with, for example, "ScoringInfo", in which information concerning a request level is described, and "DefectParameter", in which detailed information about an image defect is described.

<Configuration of PQX Data>

Figure 11:
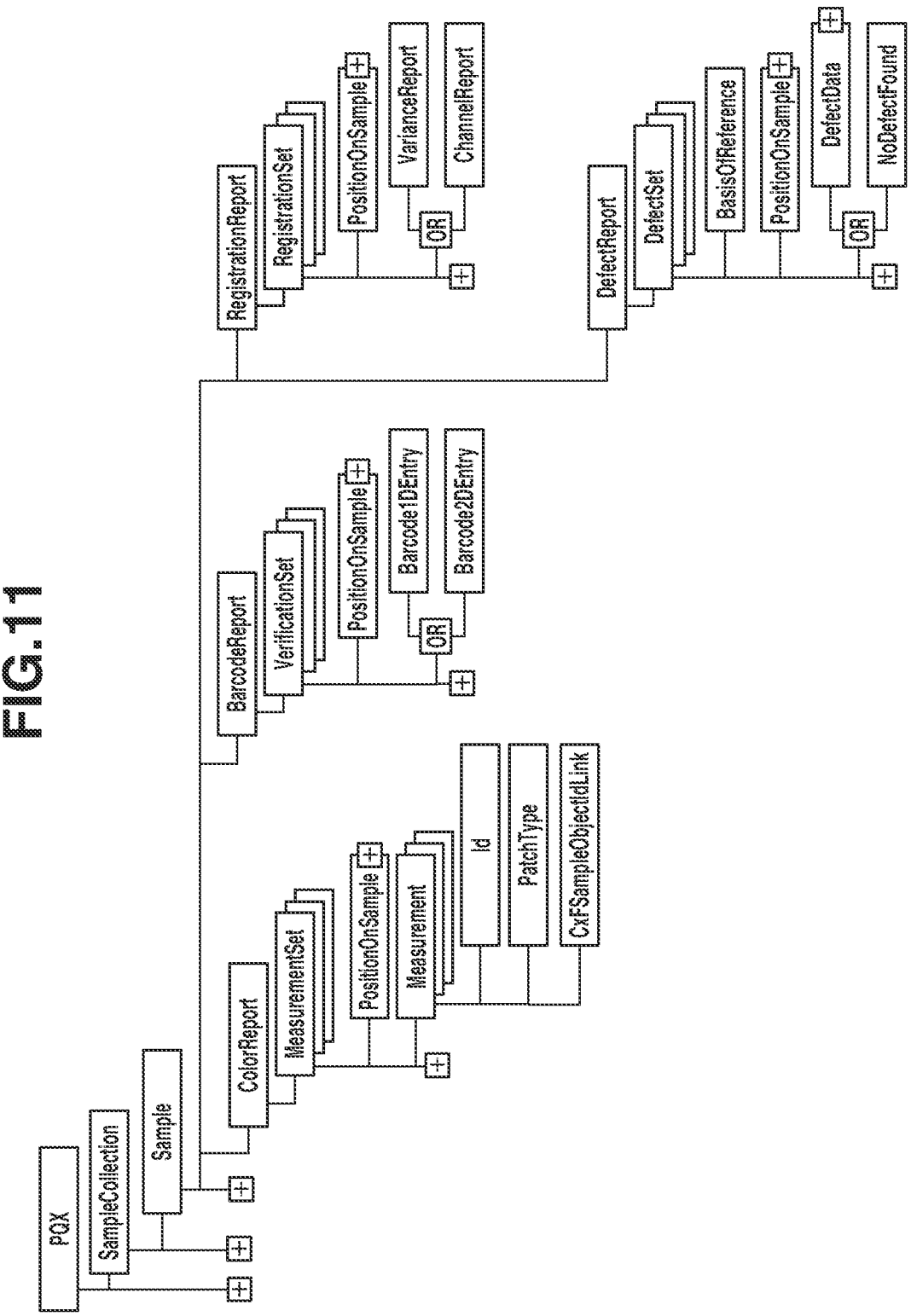
FIG. 11 is a diagram illustrating an example of a PQX configuration.

FIG. 11 is a diagram illustrating an example of configuration information about PQX data in the present exemplary embodiment. The illustrated configuration information includes only items mainly related to the present exemplary embodiment. The respective parameters and relationships between parameters illustrated in FIG. 11 are merely examples, and other items and configurations can be present as long as they are able to express pieces of information included in the respective parameters.

"PQX" indicates data described in, for example, the Extensible Markup Language (XML) text format, and is usually present one by one in association with a resultant product obtained by printing of print data. "PQX" is configured with information indicating a quality state of the resultant product obtained by printing.

"SampleCollection" is one of "PQX" elements. "SampleCollection" is configured with information concerning a quality result with respect to an evaluation item.

"Sample" is one of "SampleCollection" elements. "Sample" is configured with information concerning a track record obtained when a resultant product is generated with respect an evaluation item designated by the customer. "Sample" is configured with four items, i.e., "ColorReport", "BarcodeReport", "RegistrationReport", and "DefectReport", as a print quality in which a track record is described.

"ColorReport" is one of "Sample" elements. "ColorReport" is configured with information indicating a quality track record concerning colors. "ColorReport" is configured with, for example, "MeasurementSet", in which information about a color patch measurement result is described.

"MeasurementSet" is one of "ColorReport" elements. "MeasurementSet" is configured with, for example, "PositionOnSample", in which location information about measured color patches is described, and "Measurement", in which measurement result information about measured color patches is described.

"Measurement" is one of "MeasurementSet" elements, and is configured with, for example, "Id" of a color patch, "PatchType" thereof, and "CxFSampleObjectIdLink", in which information about a link to measurement result information is described.

"BarcodeReport" is one of "Sample" elements. "BarcodeReport" is configured with information indicating a quality track record concerning a barcode. "BarcodeReport" is configured with, for example, "VerificationSet", in which information about a result obtained by examining a quality level of the barcode is described.

"RegistrationReport" is one of "Sample" elements. "RegistrationReport" is configured with information indicating a quality track record concerning registration. "RegistrationReport" is configured with, for example, "RegistrationSet", in which information about a result obtained by examining a quality level of the registration is described.

"DefectReport" is one of "Sample" elements. "DefectReport" is configured with, for example, "DefectSet", in which information concerning a print defect examined in an inspection process is described.

<Sequence of Software Processing>

FIG. 6 is a sequence diagram illustrating software processing according to the present exemplary embodiment.

In step S601, the order reception unit 501 of the order reception system server 110 receives an order placed by the end user. The order which is received includes PDF data, which serves as print data, and request information concerning a resultant product, and is received via, for example, an operation unit of the order reception system server 110.

In step S602, the PRX generation unit 502 generates PRX data from the received print data and resultant product request information.

Figure 13:
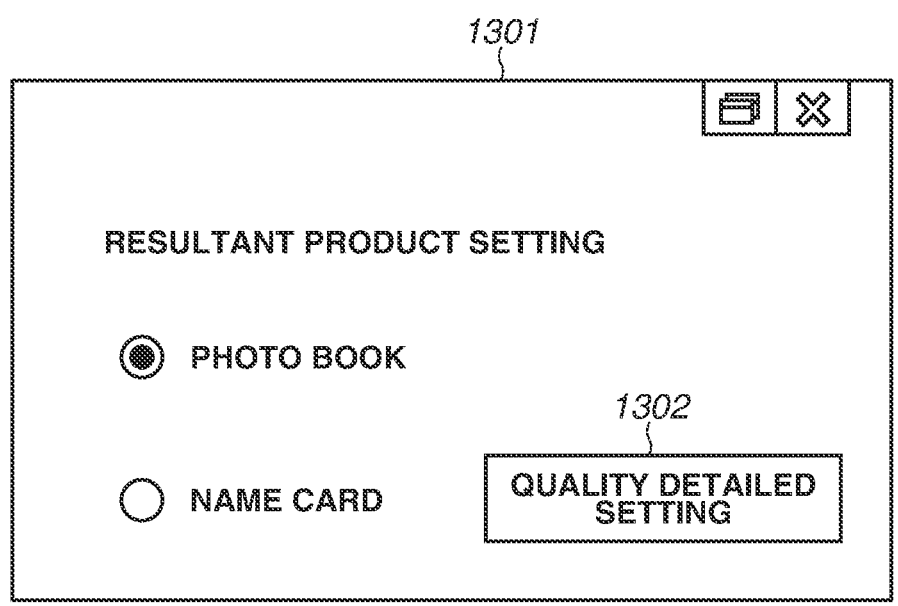
FIG. 13 is a diagram illustrating an example of a user interface (UI) for setting a print type according to the present exemplary embodiment.

FIG. 13 illustrates an example of a UI 1301 which is displayed on the order reception system server 110 according to the present exemplary embodiment. The end user selects what resultant product to generate at the time of print order with use of the UI 1301 illustrated in FIG. 13.

FIG. 14A illustrates an example of a UI 1401 which is displayed on the order reception system server 110 according to the present exemplary embodiment. The UI 1401 is displayed on the order reception system server 110 in response to the end user pressing a quality detailed setting button 1302 on the UI 1301 illustrated in FIG. 13.

The end user is able to use the UI 1401 to set detailed quality conditions with respect to the quality of a printing resultant product. For example, the end user is able to input which quality criterion the end user is requesting with respect to criterions in Japan Color for each job. This enables the end user to designate, with specific numerical values, an acceptable value and an ideal value of the average value in color difference ΔE00 (CIE DE2000) between a colorimetric value of the produced printed product and a Japan Color prescribed value. Moreover, as another example, the end user is able to set what a quality condition which the end user regards as important is out of a plurality of quality conditions. This enables the end user to set a quality condition which the end user particularly regards as important for each print job.

With regard to a method of designating a color difference between a reference color value, such as a Japan Color prescribed value, and a colorimetric value of the printing resultant product, a configuration in which the user is able to select any one of options from among a plurality of options different in the degree of quality, as illustrated in FIG. 14B, can be employed. In an example illustrated in FIG. 14B, the user is able to select the degree of a difference in average value of the color difference ΔE00 (CIE DE2000) from a Japan Color prescribed value from among "3 or less", "5 or less", and "10 or less".

FIG. 15 is a flowchart illustrating software processing according to the present exemplary embodiment.

A control program for the flowchart illustrated in FIG. 15 is stored in the ROM 212 included in the order reception system server 110 and is read out by the CPU 211 onto the RAM 213 to be executed.

In step S1501, the order reception unit 501 receives an order placed by the end user. The content of the order includes PDF data, which serves as print data, and a commercial product type concerning a resultant product. The commercial product type is information indicating the type of a resultant product, which the order reception system server 110 previously defines. For example, the order reception system server 110 is assumed to previously define two commercial product types, i.e., "photo book" and "name card". The commercial product type "photo book" represents the type of a resultant product including finishing size "A5", bookbinding type "perfect binding", paper type of text "gloss paper", and text finishing "lamination". The commercial product type "name card" represents the type of a resultant product including finishing size "name card", bookbinding type "none", and paper type "high-quality paper". Providing such commercial product types enables defining the type of a commercial product which is produced by the workflow management server 100 and the production system 120. Furthermore, in the description of the present exemplary embodiment, the end user is assumed to have selected "photo book". Moreover, while, in the description of the present exemplary embodiment, the order reception system server 110 is configured to previously define commercial product types, the present exemplary embodiment is not limited to this, and a configuration in which a business worker manually inputs an order placed by the end user can be employed.

The order reception unit 501 transmits the commercial product type received as an order from the end user via the UI 1301 to the PRX generation unit 502. In a case where the end user has selected "photo book" from among the commercial product types, the order reception unit 501 transmits information indicating that the commercial product type selected by the end user is "photo book" to the PRX generation unit 502.

In step S1502, the PRX generation unit 502 generates PRX data from the commercial product type received from the order reception unit 501 via the quality detailed setting button 1302.

First, an outline of PRX data which is generated by the present processing is described. As illustrated in FIG. 16, PRX data is configured with requests for quality, such as "MessageInfo", "BusinessInfo", and "QualitySpec".

"QualitySpec" is configured with fields including a quality specification and an evaluation criterion. "BasisOfCalculation" represents information about a calculating formula designated by a buyer for specifying a score or grade of print quality. "OverallGradingScale" represents the meaning or range of the overall score or grade. "MinimumAcceptableRank" represents an acceptable minimum quality level. "QualityParameterSet" represents, for example, a score criterion for each color, registration, image defect, and barcode. "QualityParameterSetType" represents the type of quality specification such as color, registration, image defect, and barcode. "ParameterSetName" represents the name of quality specification. "ParameterSetScoringScale" represents a score criterion definition designated by the buyer. While, in the description of the present exemplary embodiment, a part of "QualitySpec" is configured to be used, the present exemplary embodiment is not limited to this, and another field of PRX data can be configured to be used.

An example of the first "QualityParameterSet" includes color variation inspection which is performed by the print control unit 541. The print control unit 541 includes a measurement control unit (not illustrated) and is thus able to monitor color variation occurring in the production system 120 while performing production. Japan Color is an example of a printing color criterion. The production system 120 satisfying such a criterion is able to prove that the quality of a printed product is higher than or equal to a predetermined value.

In the present exemplary embodiment, the print control unit 541 performs color variation inspection by confirming that the criterion for Japan Color is satisfied for each job. The print control unit 541 inspects color variation based on an average value in color difference ΔE00 (CIE DE2000) between a colorimetric value of the printed product produced by the production system 120 and a Japan Color prescribed value. In this case, the print control unit 541 sets "Color Variation Inspection" to "QualityParameterSetName" and sets "Color" to "QualityParameterSetType". Moreover, the print control unit 541 describes the following elements in "ParameterSetScoringScale". "DisplayLabel: RankColor1". "Rank:1". "ValueRange: ΔE00 average value being 4 or more". "DisplayLabel:RankColor2". "Rank:2". "ValueRange:ΔE00 average value being less than 4 and 3 or more". "DisplayLabel:RankColor3". "Rank:3". "ValueRange:ΔE00 average value being less than 3". Higher numerical values of "Rank" represent higher levels of quality. Moreover, setting "Rank:2" to "MinimumAcceptableRank" in the present "QualityParameterSet" enables describing the minimum quality level. An example of the second "QualityParameterSet" includes appearance inspection of toner scattering performed by the inspection apparatus 124. Before starting production, the production system 120 acquires a correct answer image with use of a camera included in the inspection apparatus 124, and registers the correct answer image with the inspection apparatus 124. During performing production, the production system 120 causes the inspection apparatus 124 to acquire a printing result image with use of the camera, and compares the printing result image with the correct answer image, thus inspecting scattering of toner. In this case, the print control unit 541 sets "Scattering Inspection" to "QualityParameterSetName". Moreover, the print control unit 541 sets "Defects" to "QualityParameterSetType". Moreover, the print control unit 541 describes the following elements in "ParameterSetScoringScale". "DisplayLabel:RankDefects1". "Rank:1". "ValueRange:Scattering diameter being 3 mm or more". "DisplayLabel:RankDefects2". "Rank:2". "ValueRange:Scattering diameter being less than 3 mm and 2 mm or more". "DisplayLabel:RankDefects3". "Rank:3". "ValueRange:Scattering diameter being less than 2 mm". Higher numerical values of "Rank" represent higher levels of quality. Moreover, setting "Rank:2" to "MinimumAcceptableRank" in the present "QualityParameterSet" enables describing the minimum quality level. The print control unit 541 uses the above-described "QualityParameterSet" to calculate the rank of quality using "BasisOfCalculation". For example, the print control unit 541 describes calculating formulae for the total quality using "Rank" for color variation inspection and scattering inspection in "BasisOfCalculation". For example, the print control unit 541 describes a calculating formula such as "TotalRank=Rank (Color Variation Inspection)*0.6+Rank (Scattering Inspection)*0.3". "TotalRank" is assumed to represent the total quality, and "Rank (ParameterSetName)" is assumed to represent "Rank" corresponding to "ParameterSetName". The meaning of a rank of quality calculated with use of the above-mentioned "BasisOfCalculation" is represented by "OverallGradingScale". The print control unit 541 describes "OverallGradingScale" as follows. "DisplayLabel:Poor". "Rank:1". "DisplayLabel:Good". "Rank:2". "DisplayLabel:Excellent". "Rank:3". In the following description, the above-described PRX data representing a quality criterion is assumed to be retained as a fixed criterion value by a PRX data retention unit (not illustrated) included in the PRX generation unit 502.

In step S1502, the PRX generation unit 502 acquires PRX data corresponding to the ordered printed product from PRX data retained in a memory included in the order reception system server 110. For example, in a case where "photo book" has been selected via the UI 1301, the PRX generation unit 502 acquires PRX data for photo book from the memory.

In step S1503, the PRX generation unit 502 determines whether the end user has performed detailed setting of quality conditions with respect to the ordered printed product. For example, in a case where the user has set the required ΔE00 average value to 3 or less and the ideal ΔE00 average value to 2 or less with respect to the average value in color difference ΔE00 from a Japan Color prescribed value via the UI 1401, the PRX generation unit 502 determines that there is detailed setting of quality conditions. If it is determined that there is detailed setting of quality conditions (YES in step S1503), the PRX generation unit 502 advances the processing to step S1504, and, if it is determined that there is no detailed setting of quality conditions (NO in step S1503), the PRX generation unit 502 advances the processing to step S1505, in which the PRX generation unit 502 transmits the PRX data acquired in step S1502 to the workflow management server 100.

In step S1504, the PRX generation unit 502 reflects the content of the detailed quality condition setting in the PRX data acquired in step S1502. In the present exemplary embodiment, a case where the user has set the required ΔE00 average value to less than 3 and the ideal ΔE00 average value to less than 2 with respect to the average value in color difference ΔE00 from a Japan Color prescribed value via the UI 1401 is described as an example. The PRX generation unit 502 performs editing processing with respect to quality conditions which have been set in the following way. The PRX generation unit 502 sets "Color Variation Inspection" to "ParameterSetName" included in the PRX data acquired in step S1502. The PRX generation unit 502 sets "Color" to "QualityParameterSetType" included therein.

As shown within an enclosing line 1701 illustrated in FIG. 17, standard quality requests for photo book are previously set in "QualityParameterSet". The following elements are set in "ParameterSetScoringScale". "DisplayLabel: RankColor1". "Rank:1". "ValueRange:ΔE00 average value being 4 or more". "DisplayLabel:RankColor2". "Rank:2". "ValueRange:ΔE00 average value being less than 4 and 3 or more". "DisplayLabel:RankColor3". "Rank:3". "ValueRange:ΔE00 average value being less than 3". In "MinimumAcceptableRank", "Rank:2".

The PRX generation unit 502 changes such parameters of the PRX data to those shown within an enclosing line 1702 illustrated in FIG. 17. Specifically, the PRX generation unit 502 makes changes in the following way. "DisplayLabel: RankColor1". "Rank:1". "ValueRange:ΔE00 average value being 3 or more". "DisplayLabel:RankColor2". "Rank:2". "ValueRange:ΔE00 average value being less than 3 and 2 or more". "DisplayLabel:RankColor3". "Rank:3". "ValueRange:ΔE00 average value being less than 2". Moreover, the PRX generation unit 502 sets "Rank:2" in "MinimumAcceptableRank" included in the present "QualityParameterSet". The PRX generation unit 502 sets "Rank:3" in "DesiredRank" included therein.

"DesiredRank" included in PRX data is able to represent a quality criterion which the user expects. Using "DesiredRank" also enables notifying the workflow management server 100 of a quality criterion which the end user regards as ideal together with the minimum quality criterion. This enables a printing company to implement a higher customer satisfaction level.

Moreover, a case where the user has set important quality conditions via the UI 1401 is also described as another example. As mentioned in the above-described PRX data, using "BasisOfCalculation" enables calculating the rank of quality of a printing resultant product that is based on a plurality of quality conditions. For example, the print control unit 541 describes calculating formulae for the total quality using "Rank" for color variation inspection and scattering inspection in "BasisOfCalculation". For example, as shown within an enclosing line 1801 illustrated in FIG. 18, a calculating formula such as "TotalRank=Rank (Color Variation Inspection)*0.6+Rank (Scattering Inspection)*0.3" is assumed to be described in PRX data as a standard quality setting for photo book.

In that case, when the user has set "image defect" as an important quality condition via the UI 1401, the PRX generation unit 502 makes a change in such a way as to decrease a value of weighting for scattering inspection in the calculating formula included in "BasisOfCalculation". In the present exemplary embodiment, setting "image defect" as an important quality condition means decreasing the acceptable degree of image defect. For example, setting "image defect" as an important quality condition means tightening the criterion of inspection of scattering of toner as an image defect. For example, the PRX generation unit 502 changes the calculating formula to "TotalRank=Rank (Color Variation Inspection)*0.6+Rank (Scattering Inspection)*0.1" as shown within an enclosing line 1802 illustrated in FIG. 18. In this way, to make "Rank" set in "OverallGradingScale" higher, unless an inspection result of scattering inspection exhibits a quality level higher than the standard quality criterion, it is impossible to satisfy a quality requirement as the overall printed product. This enables inspecting setting of an important quality condition performed by the end user with a tighter criterion. In step S1505, the PRX generation unit 502 transmits PRX data edited in step S1504 to the workflow management server 100.

Furthermore, while, in the present exemplary embodiment, the detailed setting about a color difference from Japan Color serving as a reference color has been described, the detailed setting about misregistration of an image caused by elution of paper, possibility or impossibility of reading of a barcode, or an image defect can be received and reflected. Furthermore, the structure of PRX data illustrated in FIG. 17 and FIG. 18 is assumed not to need to be of the XML text format such as that illustrated in FIG. 17 and FIG. 18. Moreover, the method of describing parameters representing each quality condition or the method of describing calculating formulae can be another format such as that using a mathematical expression.

Here, for example, in a case where an order placed by the end user is photo book, a request for color tone is supposed. There can be a request for causing the skin color of a person situated in an optional page to be output beautifully or a request for matching the color tone of the entire resultant product with Japan Color, which is one of standard color spaces. The PRX generation unit 502 receives such a request and then generates PRX data based on the received request. Specifically, the PRX generation unit 502 generates "ColorParameter", which is included in "Color" elements of PRX data. In the case of a request concerning the skin color of a person, the PRX generation unit 502 records a name representing a request target, such as "BabyCheek", in "ParameterName". Moreover, the PRX generation unit 502 records information about a location in which a request target is present in "SamplingPosition". Additionally, the PRX generation unit 502 records target color tone information in "CxFReferenceObjectIdLink". In this way, the PRX generation unit 502 generates "ColorParameter". Moreover, in the case of a request for matching color tone with Japan Color, the PRX generation unit 502 records "JapanColor" in "ParameterName" and records a printing position of a patch group for color conformation in "SamplingPosition". Then, the PRX generation unit 502 records color target tone information about a patch group prescribed by Japan Color in "CxFReferenceObjectIdLink".

The print data and PRX data are transmitted to the workflow management server 100 via the data management unit 503.

When the workflow management server 100 receives the print data and PRX data via the data management unit 525, in step S603, the PRX analysis unit 521 analyzes the received PRX data. The workflow management server 100 stores, in the data management unit 525, an analysis result as a database such as that illustrated in FIG. 8. Moreover, the workflow management server 100 specifies a part of processing required for prepress from the analyzed PRX data.

FIG. 8 is a diagram illustrating an example of a database about the analyzed PRX data. The present data is generated by the PRX analysis unit 521 and is then stored in the data management unit 525. The generated data includes pieces of data the number of which corresponds to items of quality which the end user requests.

Column 801 is information indicating to which of four types of quality items, i.e., Color, Barcode, Registration, and Defect, the target quality corresponds.

Column 802 is name information assigned to each item.

Column 803 is location information about a location in which each item is present. The location information is information allocated to each object included in image data, so that an object is identified based on the location information.

Column 804 and column 805 are parameters for the case of Color item, and column 804 is information indicating whether a target color is one patch or a patch group composed of a plurality of patches. Column 805 is color tone information targeted for a target color. For a constructional reason, actual color tone information is recorded in another region, and the color tone information in column 805 is link information indicating a link to the recorded color tone information.

Column 806 is information indicating a quality level which the end user requests. For example, in the case of Color item, the information in column 806 is a numerical value of ΔE00 representing a color difference between a target value and an actually measured value, and, in the case of Barcode item, the information in column 806 indicates that a result obtained by verification performed according to a method prescribed in the International Organization for Standardization (ISO) is PASS. Moreover, in the case of Registration item, the information in column 806 is, for example, a numerical value of misregistration amount. In this way, information indicating a quality level which the end user requests differs with items.

In subsequent step S604, the prepress control unit 524 performs required prepress processing based on the PRX data analyzed in step S603. Examples of prepress processing include, if patch information is recorded in Color items, generating such a color patch image and locating the generated color patch image in a white space portion of print data. Moreover, examples of prepress processing include, if a Registration item is recorded, generating a mark image for detecting four colors or a misregistration amount between obverse and reverse surfaces and locating the mark image in a white space portion of print data.

In step S605, the process management unit 523 generates JDF data and work instruction data from the print data and the PRX data analyzed in step S603. The JDF data is a job ticket in which setting of a bookbinding finishing with respect to print data or setting of post-work which a post-work apparatus performs is recorded. Moreover, the process management unit 523 sets, to the JDF data, an instruction for measuring a color patch image or a registration mark image generated in step S604. PDF data of print data and the generated JDF data are transmitted to the production system 120.

Moreover, a part of an instruction which is able to be set by JDF data may be expressed by a format such as work instruction data. The work instruction data is information indicating an instruction for causing the printing operator to perform work which the end user requests. For example, quality confirmation work such as measurement of a patch image, barcode inspection, or product inspection is not able to be automatically performed depending on a configuration of the production system 120 and is required to be performed offline by the operator. In such an environment, the process management unit 523 generates work instruction data to communicate required work to the printing operator, thus performing a printing flow.

In subsequent step S606, the PQX generation unit 522 generates a PQX list from a result obtained by performing PRX data analysis in step S603. In the present exemplary embodiment, the PQX list refers to a list obtained by collecting pieces of information each representing a quality result concerning a resultant product in a target print job in units of items of the PQX format. In the following description, PQX list generation is described with reference to FIG. 7.

FIG. 7 is a flowchart illustrating a procedure for generating a PQX list according to the present exemplary embodiment. The present flowchart is stored as a program in the HDD 204 and is implemented by the CPU 201 loading the program onto the RAM 203 and executing the program. The present flowchart starts when the PQX generation unit 522 has entered into a state of being able to acquire PRX data analyzed and stored in step S603 for PRX analysis.

In step S701, the PQX generation unit 522 selects PRX data analyzed in a print job targeted for generation.

In step S702, the PQX generation unit 522 determines whether quality data is present in the PRX data. With PRX data illustrated in FIG. 8 taken as an example, each row of the PRX data is equivalent to one piece of quality data.

If, in step S702, it is determined that there are PRX items (YES in step S702), then in step S703, the PQX generation unit 522 selects the first quality item.

In step S704, the PQX generation unit 522 generates an item directed to one quality report which is created in the PQX format, with respect to the selected one quality item. A table in which the association between parameters of PRX data and parameters of PQX data is defined is previously stored in the HDD 204 of the workflow management server 100. The PQX generation unit 522 refers to the stored table and then generates an item directed to one quality report which is created in the PQX format, with respect to the selected one quality item.

Here, PQX data to be generated is described with reference to FIG. 9. FIG. 9 is a diagram illustrating an example of a PQX database to be generated in the present exemplary embodiment. The present data is generated by the PQX generation unit 522 and is then stored in the data management unit 525.

Column 901 is information indicating to which of four types of quality items, i.e., Color, Barcode, Registration, and Defect, the report is directed. The PQX generation unit 522 generates information in column 901 as information equivalent to column 801 of PRX data. For example, "Color" in the first row illustrated in FIG. 8 and "ColorReport" in the first row illustrated in FIG. 9 are previously registered in a table while being associated with each other. Then, the PQX generation unit 522 identifies and generates a quality report-directed item "ColorReport" based on a quality item "Color" of PRX data and the previously registered table. In the second row and subsequent rows, similarly, the PQX generation unit 522 also identifies and generates Items of PRX data based on PRX data and tables. Column 902 is name information about each item, and the PQX generation unit 522 generates information in column 902 as information equivalent to column 802 of PRX data. Column 903 is location information indicating a location in which each item is present. The location information is information allocated to each object included in image data, so that an object is identified based on the location information. The PQX generation unit 522 generates information in column 903 as information equivalent to column 803 of PRX data. Column 904 is result information indicating a result of each item. The present information is not present at the time of generation of PQX data. Data is acquired in the halfway instance of a printing process described below, and a result thereof is recorded in column 904.

In the above-mentioned way, the PQX generation unit 522 generates PQX items based on items recorded in PRX data.

In step S705, the PQX generation unit 522 determines whether all of the PRX items have been processed.

If it is determined that there is a PRX item which is not yet processed (NO in step S705), then in step S706, the PQX generation unit 522 selects a next PRX item. Then, the PQX generation unit 522 performs processing in step S704 with respect to the selected PRX item.

If, in step S705, it is determined that all of the PRX items have been processed (YES in step S705), then in step S707, the PQX generation unit 522 finalizes all of the generated PQX items as a PQX list.

If, in step S702, it is determined that there is no PRX item (NO in step S702), then in step S708, the PQX generation unit 522 generates a vacant PQX list, and then advances the processing to step S707.

Upon performing the above-mentioned flow, the PQX generation unit 522 generates a PQX list in step S606 for PQX list generation.

Moreover, since the PQX list to be generated here is generated by analyzing PRX data, it is apparent that an item which is not described in PRX data is not present as an item in a PQX list.

In step S607, the print control unit 541 of the production system 120 performs printing of print data received from the workflow management server 100. The print control unit 541 causes the print server 122 to perform raster image processing (RIP) on the received PDF data and causes the printing apparatus 121 to perform halftone processing, thus performing printing. Moreover, as needed, the post-processing work control unit 542 may perform post-processing with use of the post-processing work apparatus 123 based on setting information about JDF data.

In step S608, the print control unit 541 analyzes JDF data to determine whether there is an instruction for measuring a color patch. If it is determined that there is no instruction for measuring a color patch (NO in step S608), the print control unit 541 skips processing concerning measurement of a patch and advances the processing to step S611.

If it is determined that there is an instruction for measuring a patch or a mark in JDF data (YES in step S608), then in step S609, the print control unit 541 performs measurement of a target color patch. The print control unit 541 controls the measurement unit 322 included in the printing apparatus 121 to read a color value of the patch with a sensor. The color value to be read is generally, for example, density data or a color value typified by L*a*b*. After measuring a color value of the patch, the data management unit 544 of the production system 120 transmits the acquired measurement result to the workflow management server 100. The patch to be measured is not limited to one patch, but can include a plurality of patches.

Upon receiving color value information obtained by measuring a patch from the production system 120, in step S610, the data management unit 525 of the workflow management server 100 stores the received result in a PQX database. In the present exemplary embodiment, the data management unit 525 stores the measurement result in column 904 of the PQX database.

In step S611, the inspection control unit 543 of the production system 120 analyzes JDF data to determine whether there is an instruction for inspection. Examples of the instruction for inspection include an instruction for determining the presence or absence of misprinting designated by the "Defect" item in PRX data.

In step S612, the inspection control unit 543 causes the inspection apparatus 124 to perform inspection processing. With the above-mentioned presence or absence of misprinting taken as an example, the inspection apparatus 124 captures an image of the printed resultant product on a page-by-page basis with a camera (not illustrated), compares the captured image with a previously registered correct answer image, and determines that misprinting has occurred when a mismatched portion has been detected. The inspection control unit 543 automatically transmits the inspection result from the inspection apparatus 124 to the production system 120. Moreover, with use of the above-mentioned work instruction data, the operator can visually check the presence or absence of misprinting. In that case, for example, the operator communicates the printing result to the workflow management server 100 via the production operator terminal 125.

Upon receiving the inspection result from the production system 120, in step S613, the data management unit 525 of the workflow management server 100 stores the received inspection result in a PQX database. In the present exemplary embodiment, the data management unit 525 stores the measurement result in column 904 of the PQX database.

In subsequent step S614, the quality report creation unit 526 of the workflow management server 100 creates a quality report. The quality report is data obtained by documenting PQX data into a format easy for the system administrator or end user to confirm. Usually, the quality report is created one by one together with a resultant product with respect to a job ordered by the end user. The quality report creation unit 526 transmits the thus-generated quality report to the order reception system server 110 via the data management unit 525.

In step S615, the data management unit 503 of the order reception system server 110 stores the quality report received from the workflow management server 100. The stored quality report becomes able to be confirmed by the system administrator or end user via the respective terminals 111 and 112.

The above-described processing automatically generates, from quality request data, items required for creating a quality report in which a result obtained at the time of resultant product generation has been described and collects the generated items into a list. Thus, it becomes possible to identify quality confirmation items required for creating a quality report with respect to a plurality of different quality request items present in each job.

In the above-described exemplary embodiment, an information processing system which analyzes PRX data to generate a PQX item list serving as quality items required for confirmation, records a control result received from the production system with respect to each PQX item, and creates a quality report based on the control result has been described.

In a quality report, it is necessary that all of the quality measurement results obtained at the time of resultant product outputting with respect to quality items which the customer has requested at the time of order placement are described. However, since quality items to be described in a quality report differ with jobs, it is difficult to determine whether just the right amount of required information has been recorded in a created quality report.

Therefore, another exemplary embodiment proposes a system including a unit which, when creating a quality report in step S614 for quality report creation, determines whether result information has been recorded with respect to all of the items of a PQX list generated in step S606.

The overall system configuration, hardware configuration, and software configuration according to the present exemplary embodiment are similar to those of the above-described exemplary embodiment, and are, therefore, omitted from description. The overall flow of software processing is also essentially similar to the flow described with reference to FIG. 6 in the above-described exemplary embodiment, and is, therefore, omitted from description.

The flow which is performed at the time of quality report creation, which is characteristics of the present exemplary embodiment, is described with reference to FIG. 12.

Figure 12:
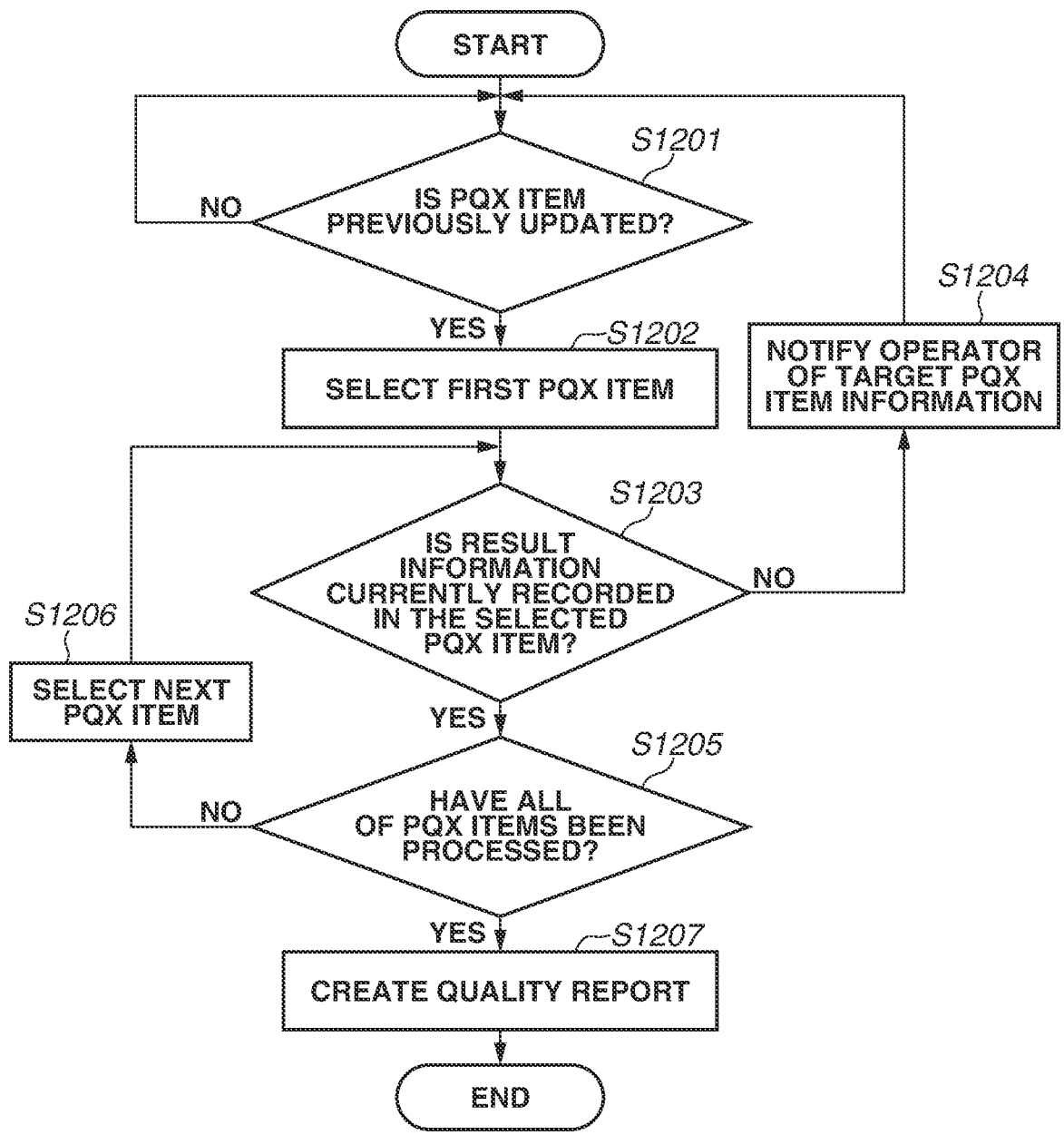
FIG. 12 is a flowchart illustrating software processing according to another exemplary embodiment.

FIG. 12 is a flowchart illustrating quality report creation processing according to the present exemplary embodiment. The present flowchart is stored as a program in the HDD 204 and is implemented by the CPU 201 loading the program onto the RAM 203 and executing the program. The present flowchart is performed by the quality report creation unit 526 in step S614 for quality report creation.

In step S1201, the quality report creation unit 526 determines whether there is updating of a PQX item described in a PQX list. Updating of a PQX item is premised on that a quality confirmation result is recorded with respect to an optional PQX item. Recording of a quality confirmation result is performed by the quality confirmation result being received from the production system 120. Moreover, recording of a quality confirmation result is performed by the user inputting the quality confirmation result via the workflow management terminal 101.

If it is determined that there is updating of PQX data (YES in step S1201), then in step S1202, the quality report creation unit 526 selects the first PQX item. If it is determined that there is no updating (NO in step S1201), the quality report creation unit 526 returns the processing to the top of the present flowchart.

In subsequent step S1203, the quality report creation unit 526 determines whether quality confirmation result information is currently recorded in the selected PQX item.

If it is determined that resultant information is not currently recorded in the PQX item (NO in step S1203), then in step S1204, the quality report creation unit 526 notifies the operator of the target PQX item information. The method of notification includes, for example, displaying that effect on a display (not illustrated) of the production operator terminal 125. After notification, the quality report creation unit 526 returns the processing to the top of the present flowchart.

If it is determined that resultant information is currently recorded in the PQX item in a proper fashion (YES in step S1203), then in step S1205, the quality report creation unit 526 determines whether all of the PQX items have been processed.

If it is determined that there is a PQX item which is not yet processed (NO in step S1205), then in step S1206, the quality report creation unit 526 selects a next PQX item. Then, the quality report creation unit 526 performs processing in step S1203 with respect to the selected PQX item.

If it is determined that required quality confirmation results are currently recorded with respect to all of the PQX items (YES in step S1205), then in step S1207, the quality report creation unit 526 creates a quality report.

With the above-described processing, in the present exemplary embodiment, only in a case where quality confirmation results are currently recorded with respect to all of the PQX items present in a PQX list, a quality report is created. With such processing performed, since such factors that some items drop out or unnecessary items come in are eliminated, it can be ensured, as a system, that all of the quality items which the customer requests are described in a quality report.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-038138, filed Mar. 5, 2020, which is hereby incorporated by reference herein in its entirety.

What is claimed is:

1. A job processing system which causes a job processing apparatus to execute a job, the job processing system comprising:
   a network interface that receives quality request data; and
   a controller that specifies based on the quality request data received by the network interface, an item a notification of which is to be performed as a quality of a resultant product which is obtained by executing the job from among a plurality of items concerning quality,
   wherein the job processing system receives quality data of the resultant product, and
   wherein the job processing system performs, based on the item specified by the controller and the received quality data, notification of a quality of the resultant product with respect to the item specified by the controller from among the plurality of items concerning quality.

2. The job processing system according to claim 1, wherein the quality request data includes an item a notification of which is to be performed as the quality of the resultant product which is obtained by executing the job from among a plurality of items concerning quality.

3. The job processing system according to claim 1, wherein the item a notification of which is to be performed as the quality of the resultant product which is obtained by executing the job is able to be designated by a user.

4. The job processing system according to claim 1,
   wherein the controller is able to specify a plurality of items a notification of which is to be performed as the quality of the resultant product which is obtained by executing the job, and
   wherein, in response to a quality of the resultant product being received with respect to all of the plurality of items specified by the controller, the job processing system performs the notification of the quality of the resultant product.

5. The job processing system according to claim 1, wherein the job processing system receives the quality data of the resultant product from the job processing apparatus.

6. The job processing system according to claim 1, wherein the job processing system receives the quality data of the resultant product as the quality of the resultant product being input by a user.

7. The job processing system according to claim 1, wherein the quality request data includes information about at least one of barcode, color misregistration, smear, and blurring.

8. The job processing system according to claim 1,
   wherein the job includes a print job, and
   wherein the job processing apparatus includes a printing apparatus.

9. The job processing system according to claim 1,
   wherein the network interface further receives a setting, and
   wherein the job processing system causes the job processing apparatus to execute the job based on the received setting.

10. A control method for a job processing system which causes a job processing apparatus to execute a job, the control method comprising:
    receiving quality request data;
    specifying, based on the received quality request data, an item a notification of which is to be performed as a quality of a resultant product which is obtained by executing the job from among a plurality of items concerning quality;
    receiving quality data of the resultant product; and
    issuing, based on the specified item and the received quality data, a notification of a quality of the resultant product with respect to the item specified from among the plurality of items concerning quality.

11. The control method according to claim 10, wherein the quality request data includes an item a notification of which is to be performed as the quality of the resultant product which is obtained by executing the job from among a plurality of items concerning quality.

12. The control method according to claim 10, wherein the item a notification of which is to be performed as the quality of the resultant product which is obtained by executing the job is able to be designated by a user.

13. The control method according to claim 10, further comprising:
    specifying a plurality of items a notification of which is to be performed as the quality of the resultant product which is obtained by executing the job; and
    in response to a quality of the resultant product being received with respect to all of the specified plurality of items, issuing the notification of the quality of the resultant product.

14. The control method according to claim 10, further comprising receiving the quality data of the resultant product from the job processing apparatus.

15. The control method according to claim 10, further comprising receiving the quality data of the resultant product as the quality of the resultant product being input by a user.

16. The control method according to claim 10, wherein the quality request data includes information about at least one of barcode, color misregistration, smear, and blurring.

17. The job processing system according to claim 10,
    wherein the job includes a print job, and
    wherein the job processing apparatus includes a printing apparatus.

18. A non-transitory computer-readable storage medium storing computer-executable instructions that, when executed by a computer, cause the computer to perform a control method for a job processing system which causes a job processing apparatus to execute a job, the control method comprising:
    receiving quality request data;
    specifying, based on the received quality request data, an item a notification of which is to be performed as a quality of a resultant product which is obtained by executing the job from among a plurality of items concerning quality;
    receiving quality data of the resultant product; and
    issuing, based on the specified item and the received quality data, a notification of a quality of the resultant product with respect to the item specified from among the plurality of items concerning quality.

* * * * *